(12) United States Patent
Abreu

(10) Patent No.: US 9,402,121 B2
(45) Date of Patent: Jul. 26, 2016

(54) WEARABLE ELECTRONIC DEVICE

(71) Applicant: GEELUX HOLDINGS, LTD., Tortola (VG)

(72) Inventor: Marcio Marc Abreu, Bridgeport, CT (US)

(73) Assignee: GEELUX HOLDINGS, LTD., Tortola, Virgin Islands (GB)

( * ) Notice: Subject to any disclaimer, the term of this patent is extended or adjusted under 35 U.S.C. 154(b) by 0 days.

(21) Appl. No.: 14/594,118

(22) Filed: Jan. 10, 2015

(65) Prior Publication Data

US 2015/0201266 A1    Jul. 16, 2015

Related U.S. Application Data

(60) Provisional application No. 61/926,156, filed on Jan. 10, 2014, provisional application No. 61/942,877, filed on Feb. 21, 2014.

(51) Int. Cl.
| | |
|---|---|
| *H04R 9/08* | (2006.01) |
| *H04R 1/10* | (2006.01) |
| *H04B 1/3827* | (2015.01) |
| *H04R 5/02* | (2006.01) |
| *H04R 1/02* | (2006.01) |
| *H04R 1/08* | (2006.01) |

(52) U.S. Cl.
CPC ............. *H04R 1/1033* (2013.01); *H04B 1/385* (2013.01); *H04R 1/028* (2013.01); *H04R 1/08* (2013.01); *H04R 1/083* (2013.01); *H04R 5/023* (2013.01); *H04R 2201/023* (2013.01); *H04R 2205/021* (2013.01)

(58) Field of Classification Search
USPC .......................... 381/367, 364, 301, 333, 388
See application file for complete search history.

(56) References Cited

U.S. PATENT DOCUMENTS

| | | |
|---|---|---|
| 2,249,572 A | 7/1941 | Lieber |
| 3,528,734 A | 9/1970 | Bruel et al. |
| 4,456,797 A | 6/1984 | Olsen |
| 4,902,120 A | 2/1990 | Weyer |
| 4,942,617 A | 7/1990 | Boylan |
| 5,034,995 A | 7/1991 | Ciccone |

(Continued)

FOREIGN PATENT DOCUMENTS

| | | |
|---|---|---|
| EP | 1049310 A1 | 2/2000 |
| GB | 2320990 A | 7/1998 |

(Continued)

OTHER PUBLICATIONS

English translation of Notification of Reason for Refusal; issued by the Japanese Patent Office on May 11, 2015, which corresponds to Japanese Patent Application No. 2013-162822.

(Continued)

*Primary Examiner* — Davetta Goins
*Assistant Examiner* — Amir Etesam
(74) *Attorney, Agent, or Firm* — Studebaker & Brackett PC

(57) ABSTRACT

Hands-free electronic devices and electronic functions that can be worn on the surface of the body in a biologically fit manner are described. The embodiments provide a convergence between electronic products, and biological, anatomical, and biomechanical aspects of the human body while providing hands-free and interchangeable wearable electronic apparatuses that can interact with human senses and physiology of a human body in a practical manner.

14 Claims, 23 Drawing Sheets

(56) References Cited

U.S. PATENT DOCUMENTS

| | | |
|---|---|---|
| 5,164,987 A | 11/1992 | Raven |
| 5,422,957 A | 6/1995 | Cummins |
| 5,608,808 A | 3/1997 | da Silva |
| 5,715,323 A | 2/1998 | Walker |
| 5,737,436 A | 4/1998 | Boyden |
| 5,881,160 A | 3/1999 | Sheppard |
| 6,095,820 A | 8/2000 | Luxon et al. |
| 6,097,822 A | 8/2000 | Min |
| 6,176,576 B1 | 1/2001 | Green et al. |
| 6,633,770 B1 | 10/2003 | Gitzinger et al. |
| 6,643,528 B1 | 11/2003 | Shim et al. |
| 6,690,808 B2 | 2/2004 | Urwyler |
| 6,834,820 B2 * | 12/2004 | Wei .................... B65H 75/4449 191/12.2 R |
| 6,915,934 B2 | 7/2005 | Hassett |
| 6,920,228 B2 | 7/2005 | Redmer et al. |
| D533,539 S | 12/2006 | Mah |
| 7,519,192 B1 | 4/2009 | Laycock et al. |
| 7,702,122 B2 | 4/2010 | Crutcher |
| 8,573,458 B1 * | 11/2013 | Hamilton ....................... 224/674 |
| 2001/0035242 A1 | 11/2001 | Hughs et al. |
| 2002/0072387 A1 | 6/2002 | Kao |
| 2002/0193151 A1 | 12/2002 | Edreich |
| 2003/0036414 A1 | 2/2003 | Huang |
| 2003/0040285 A1 | 2/2003 | Whitley |
| 2003/0042348 A1 | 3/2003 | Salentine |
| 2003/0108217 A1 | 6/2003 | Tilbury et al. |
| 2003/0182003 A1 | 9/2003 | Takashima |
| 2004/0077382 A1 | 4/2004 | Verity |
| 2004/0204165 A1 | 10/2004 | Huang |
| 2005/0078274 A1 | 4/2005 | Howell et al. |
| 2005/0128431 A1 | 6/2005 | Jannard et al. |
| 2005/0201585 A1 | 9/2005 | Jannard et al. |
| 2005/0220316 A1 | 10/2005 | Hsiang |
| 2005/0248717 A1 | 11/2005 | Howell |
| 2005/0255883 A1 | 11/2005 | Hood |
| 2005/0255898 A1 * | 11/2005 | Huang ................. H04B 1/3877 455/575.8 |
| 2006/0011687 A1 * | 1/2006 | Wadley ..................... A45F 3/00 224/587 |
| 2006/0013410 A1 | 1/2006 | Wurtz |
| 2006/0023158 A1 | 2/2006 | Howell et al. |
| 2006/0093178 A1 | 5/2006 | Chen |
| 2006/0153409 A1 | 7/2006 | Yeh |
| 2006/0177086 A1 | 8/2006 | Rye et al. |
| 2006/0185062 A1 | 8/2006 | Peng et al. |
| 2006/0251283 A1 | 11/2006 | Yeh |
| 2007/0064969 A1 | 3/2007 | Chou |
| 2007/0215663 A1 | 9/2007 | Chongson et al. |
| 2008/0143954 A1 | 6/2008 | Abreu |
| 2008/0156606 A1 | 7/2008 | Entner |
| 2009/0175482 A1 | 7/2009 | Crutcher |
| 2012/0264492 A1 * | 10/2012 | Stewart ....................... 455/575.2 |
| 2012/0328144 A1 | 12/2012 | Dugger et al. |

FOREIGN PATENT DOCUMENTS

| | | |
|---|---|---|
| JP | S52-107638 U | 8/1977 |
| JP | 58-113913 A | 7/1983 |
| JP | S61-125081 U | 8/1986 |
| JP | H63-120585 A | 5/1988 |
| JP | H01-129988 U | 9/1989 |
| JP | H06-081194 U | 11/1994 |
| JP | H06-81194 U | 11/1994 |
| JP | H07-209600 A | 11/1995 |
| JP | H07-312791 A | 11/1995 |
| JP | H08-237349 A | 9/1996 |
| JP | 3043585 U | 9/1997 |
| JP | 2002-515197 A | 5/2002 |
| JP | 2002-238092 A | 8/2002 |
| JP | 2002-278670 A | 9/2002 |
| JP | 2003-505718 A | 2/2003 |
| JP | 2009-527134 A | 7/2009 |
| WO | 01/06298 A1 | 1/2001 |
| WO | 01/11917 A1 | 2/2001 |
| WO | 02/086599 A1 | 10/2002 |
| WO | 2005/115048 A1 | 12/2005 |
| WO | 2007/081745 A2 | 7/2007 |

OTHER PUBLICATIONS

English translation of a Notification of Reasons for Rejection; issued by the Japanese Patent Office on Feb. 13, 2012, which corresponds to Japanese Patent Application No. 2008-549558.

A Patent Examination Report No. 2; issued by the Australian Government, IP Australia on Aug. 7, 2014, which corresponds to Australian Patent Application No. 2013201164.

An Office Action issued by the Canadian Intellectual Property Office on Jun. 7, 2010, which corresponds to Canadian Patent Application No. 2,636,159.

A Third Office Action issued by the Canadian Intellectual Property Office on Apr. 10, 2013, which corresponds to Canadian Patent Application No. 2,636,159.

A Second Office Action issued by the Canadian Intellectual Property Office on May 16, 2012, which corresponds to Canadian Patent Application No. 2,636,159.

A "Communication pursuant to Article 94(3) EPC," issued by the European Patent Office on Nov. 19, 2012, which corresponds to European Patent Application No. 07 717 926.5-2217.

A Patent Examination Report No. 2; issued by the Australian Government, IP Australia on Jun. 28, 2012, which corresponds to Australian Patent Application No. 2007205168.

International Search Report and Written Opinion; PCT/US2007/000177; Feb. 20, 2008.

An English translation of an Office Action; "Notification of Reasons for Rejection," issued by the Japanese Patent Office; which corresponds to Japanese Patent Application 2013-162822.

An Office Action; "Notification of Reasons for Rejection," issued by the Japanese Patent Office on May 12, 2014, which corresponds to Japanese Patent Application 2008-549558.

A "Decision to Grant," issued by the Japanese Patent Office on Apr. 13, 2015; which corresponds to Japanese Patent Application 2008-549558.

International Search Report; PCT/US2015/010937; May 6, 2015.

* cited by examiner

FIG. 21
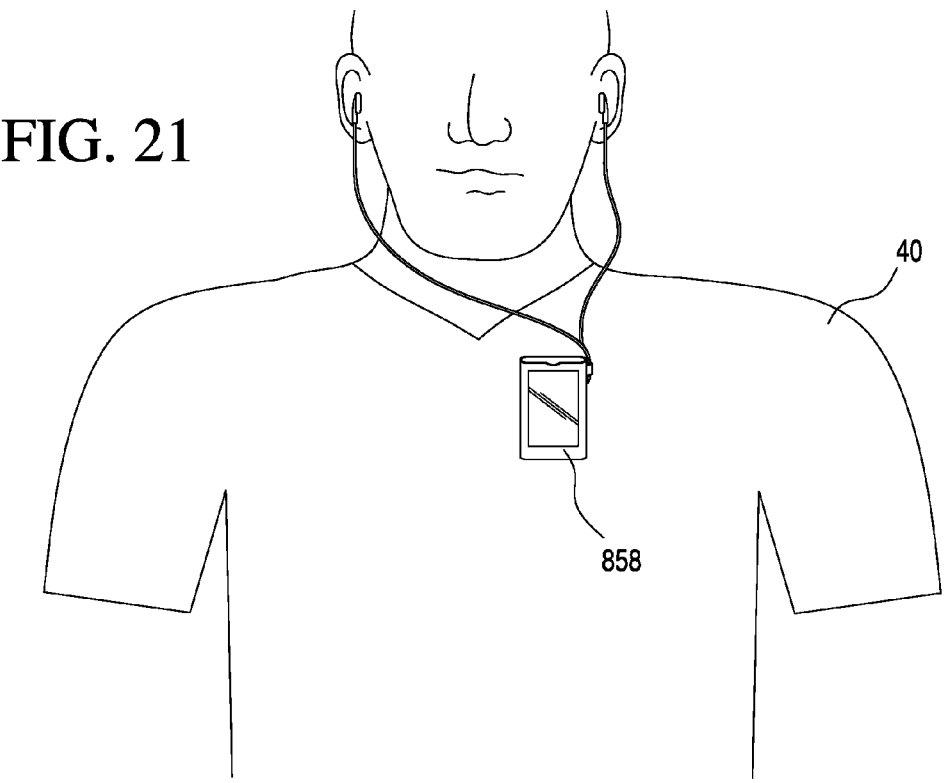
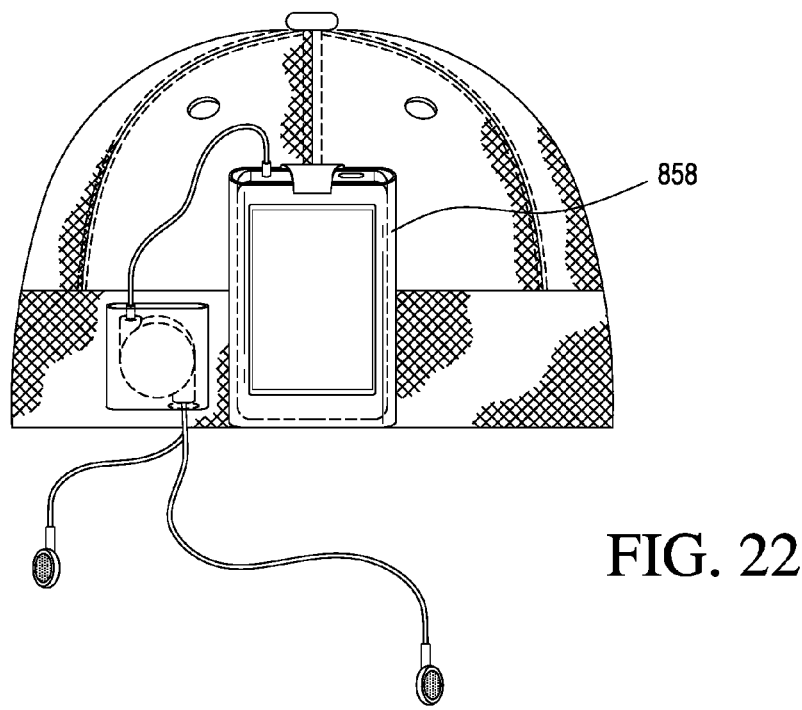
FIG. 22

WEARABLE ELECTRONIC DEVICE

CROSS-REFERENCE TO RELATED APPLICATIONS

This application claims the benefit of priority to U.S. Provisional Patent Application Nos. 61/926,156, filed on Jan. 10, 2014 and 61/942,877, filed on Feb. 21, 2014, which are hereby incorporated by reference in their entirety.

TECHNICAL FIELD

This disclosure relates to wearable electronics.

BACKGROUND

In recent years, the use of cellular phones, music players, video players, video games, computers, and other hand-held electronic products has greatly increased. Because these devices are hand-held, some of those electronic devices, such as computers, are often carried by the user in a separate case. There have been attempts to create wearable electronics such as music players integrated into the frames of eyewear, eyewear radio devices, and wearable computers. However, due to a disconnection between electronic products and the biological aspects of the human body, conventional devices have failed to provide a useful wearable electronic apparatus that adequately interacts with the human body and which fits anatomically and physiologically with the body while allowing full interaction of senses including vision.

SUMMARY

This disclosure provides an electronic device, comprising a housing and headphones. The housing includes a headphone receiver. The housing is secured to a user in a location that is transversely offset a spaced distance from a central axis of the user. The headphones include a connector configured to attach to the headphone receiver, a first ear bud attached to the connector by a first wire, and a second ear bud attached to the connector by a second wire, the first wire configured to have a first length, and the second wire configured to have a second length, and the ratio of the first length to the second length is at least 1.25:1.

Advantages and features of the embodiments of this disclosure will become more apparent from the following detailed description of exemplary embodiments when viewed in conjunction with the accompanying drawings.

BRIEF DESCRIPTION OF THE DRAWINGS

FIG. 21 is a view of a shirt and holder using the headphones of FIG. 20 in accordance with an exemplary embodiment of the present disclosure.

FIG. 22 is a view of a hat and holder using the headphones of FIG. 20 in accordance with an exemplary embodiment of the present disclosure.

DETAILED DESCRIPTION

Figure 1:
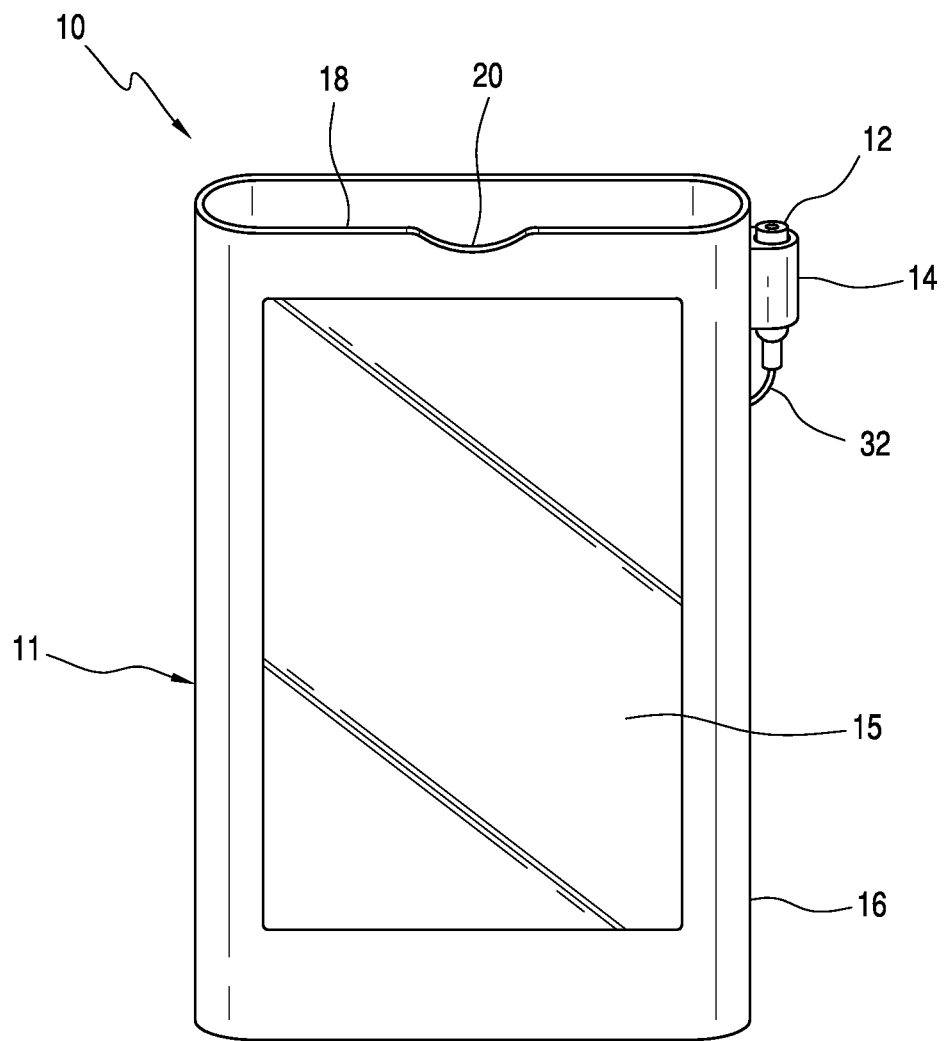
FIG. 1 is a front view of a holder in accordance with an exemplary embodiment of the present disclosure.

Applicant recognized that currently available configurations of wearable electronics lacked sufficient ergonomic compatibility with the human body to have the wearable electronics feel as though they were an integral portion of a wearer's body, or would not affect the ability of a wearer to perform a variety of daily activities, including exercising. Furthermore, Applicant recognized that it would be desirable to provide electronic devices and electronic functions which are hands-free and can be worn on the surface of the body in a biologically fit manner. The embodiments of the present disclosure provide a convergence between electronic products, and biological, anatomical, and biomechanical aspects of the human body while providing hands-free and interchangeable wearable electronic apparatuses that can interact with human senses and physiology of a human body in a practical manner.

In addition, conventional "hand-held" devices require that they be held. While some cellular phones and digital players have accessories that permit the user to operate the device without having to hold it by having a second device, using such apparatus and accessories is cumbersome, and it is necessary to carry and store the accessories until they are actually used.

Moreover, hand-held devices are easily lost or misplaced, and unattended hand-held devices can be easily stolen. It would be very useful to have a non-hand-held and hands-free device that can be worn in a comfortable, non-obtrusive, and biologically-fit manner without requiring the user to carry extra devices in addition to equipment already being worn on the body. Embodiments of the present disclosure allow hand-held devices to become hands-free devices and to be worn on the body.

The risk of exposure to radiation may be a serious problem with wearable electronics. For example, cell phones and other computing and communication devices all emit radio frequency (RF) energy. RF energy is a form of electromagnetic radiation that can pose cancer risk to the user. Cellular phones' main source of RF energy is produced through the antenna, and most phones are held close to the side of the head when the in use. The closer the antenna is to the head, the greater a person's expected exposure to RF energy.

RF energy produced by cell phones may affect the brain and other tissues in the head because hand-held cell phones are usually held close to the head. Researchers have focused on whether RF energy can cause malignant brain tumors. The salivary glands also may be exposed to RF energy from cell phones held close to the head, and cancer of salivary glands has been associated with cell phone use.

An alternative to hand-held devices are Bluetooth® headsets. However, Bluetooth® headsets also emit RF energy. While many earpiece devices emit lower levels of radiation than cell phones, the earpiece does put the source of power closer to the brain. Therefore, Bluetooth® headsets can cause the same problems as hand-held cellular phones. Besides, the cell phone itself continues to emit radiation locally and then through the body to reach the Bluetooth headset in the head, increasing exposure to radiation.

It is an object of the present disclosure to provide a wearable holder that houses an electronic device and avoid or minimize exposure to radiation.

The present disclosure teaches a convergence between electronic products and the anatomical, and biomechanical aspects of the human body while providing a series of hands free wearable electronic apparatuses that can interact with human senses.

The present disclosure provides a fully compact system when not in use, and which allows full interaction of the device with vision, hearing, speech, and tactile function while being used.

It is yet another object of the present disclosure to provide hands-free support structure for housing electronics.

These and other objects of the present disclosure, as well as many of the intended advantages thereof, will become more readily apparent when reference is made to the following description taken in conjunction with the accompanying drawings.

In describing an exemplary embodiment of the present disclosure illustrated in the drawings, specific terminology will be used for the sake of clarity. However, the present disclosure is not intended to be limited to the specific terms so selected, and it should be understood that each specific term includes all technical equivalents which operate in similar manner to accomplish a similar purpose.

The present disclosure teaches methods and devices that allow a plurality of hand held devices to be hands free and radiation free by eliminating or reducing radiation being emitted to radiation sensitive parts of the body as the head and ear canal. The present disclosure provides a support structure referred to herein as a holder. An electronic device, such as a cell phone is housed in the holder and is removably attached to the holder. The connection between the electronic device and the holder includes an extendable cord, most preferably a spool with retractable wires, or a coiled wire capable of elongation and with spring capabilities. The electronic device is releasably connected to an electrical connection in the holder. Specially manufactured ear buds are also removably attached to the holder. It should also be understood that communication between the electronic device, holder, and ear phone may be wired or wireless.

Other features, benefits, and advantages of the present disclosure will appear from the following description in conjunction with the accompanying drawings.

FIG. 1 shows a perspective front view of a holder 10 in accordance with an exemplary embodiment of the present disclosure. Holder 10 includes a front portion 15, preferably covered by clear plastic housing 11 with a headphone receiver 12 wrapped by a stabilizer 14 to keep it positioned in place alongside or along an edge 16 of housing 11. A front-top lip 18 of housing 11 has a dip or inset 20 to make it easier to pull an electrical or electronic device from holder 10. The device in an exemplary embodiment being a cell phone.

Figures 2, 3:
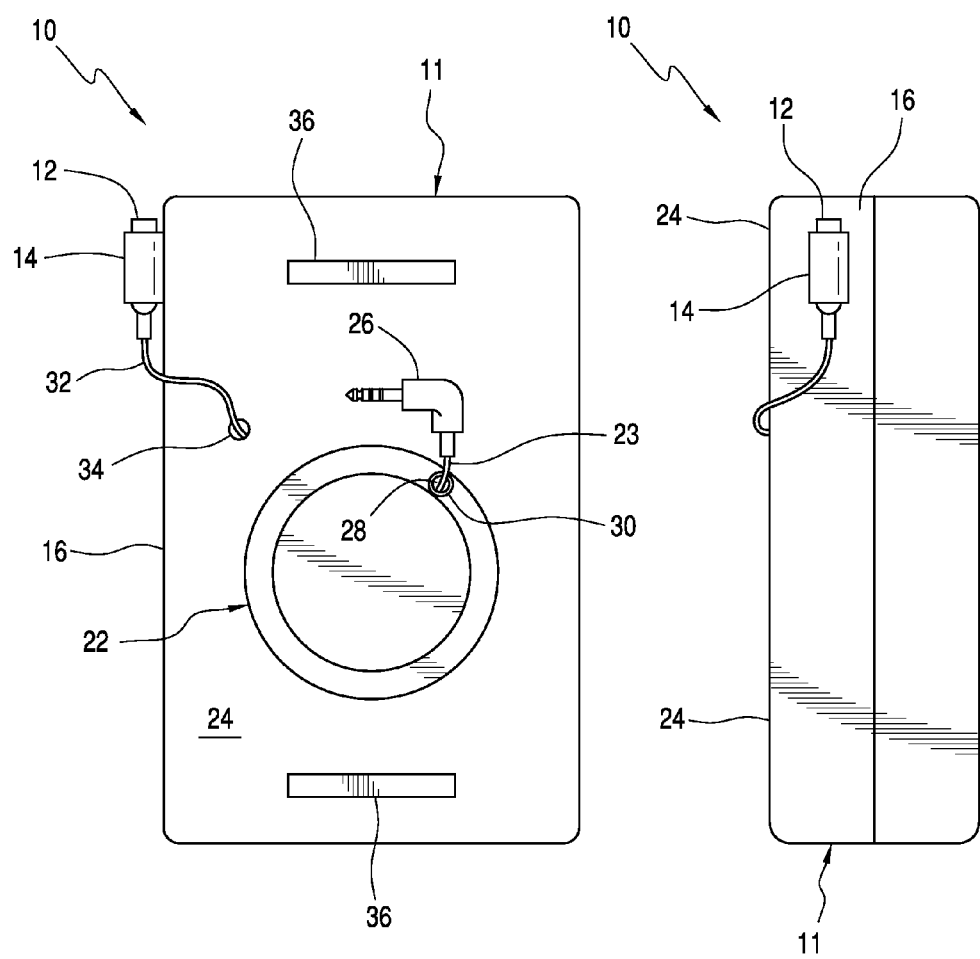
FIG. 2 is a back view of the holder of FIG. 1.
FIG. 3 is a side view of the holder of FIG. 1.

FIGS. 2 and 3 show a perspective back and side view of holder 10, respectively, with a retractable cable assembly 22 embedded on a back 24 of housing 11. Retractable cable assembly 22 includes a connector 26, which may be positioned at a top-right location when viewed from back 24 of holder 10, which is attached to holder 10 by a cable 23. Cable assembly 22 further includes an assembly opening 28 which may be surrounded by a ring 30, which may be made of metal, plastic, or other suitable materials. Ring 30 and the location of assembly opening 28 at the top-right position allow cable 23 to slide in and out without interference. However, in other embodiments, assembly opening 28 may be positioned in other orientations. Headphone receiver 12 is connected to holder 10 by a headphone wire or cable 32, which may extend through a headphone wire opening 34 positioned on back 24 of housing 11. Holder 10 may include an attachment device 36 positioned on housing 11 that may be used to attach holder 10 to clothes, hats, bags, and other items.

Figure 4:
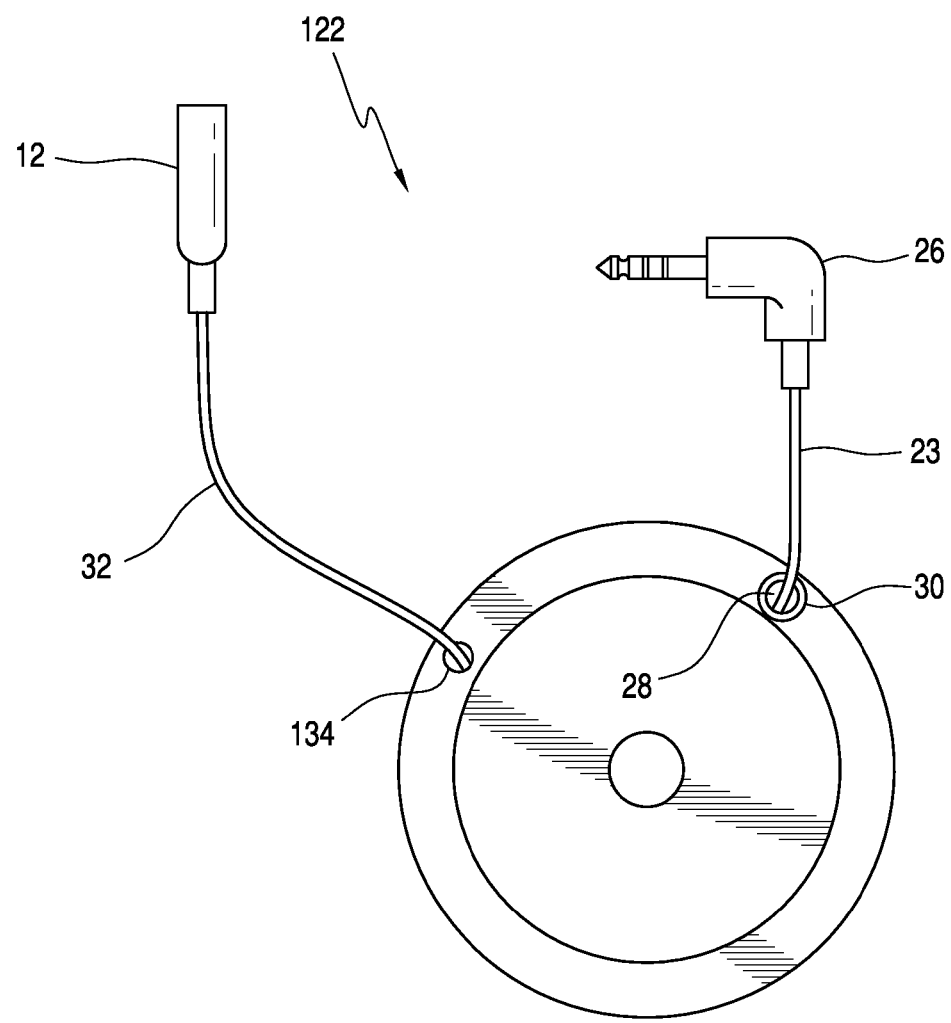
FIG. 4 is front view of a retractable cable embedded in the holder of FIG. 1.

FIG. 4 shows an alternative embodiment retractable cable assembly 122. In this embodiment, assembly opening 28 for connector 26 is positioned in the top-right position, and headphone receiver 12 extends from a headphone wire opening 134 positioned in the top-left corner of retractable cable assembly 122.

Figure 5:
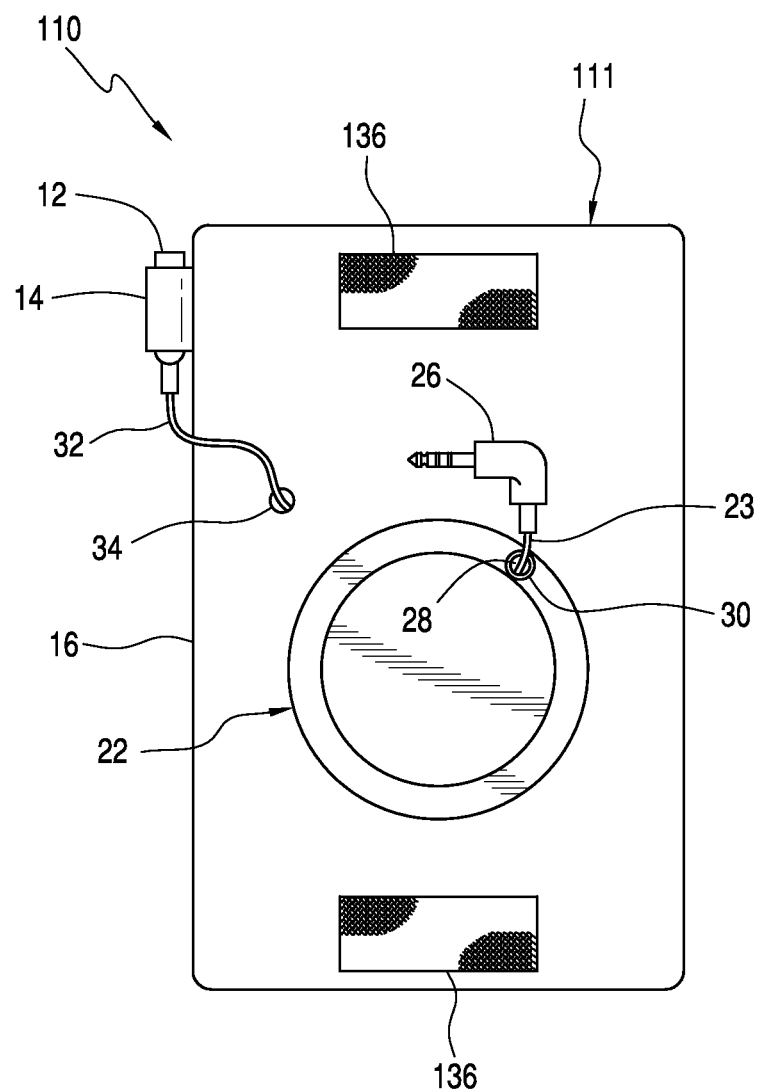
FIG. 5 is a back view of an embodiment of a holder in accordance with an exemplary embodiment of the present disclosure.

FIG. 5 shows a back view of a holder 110 in accordance with an exemplary embodiment of the present disclosure that is similar to holder 10. Features with the same item numbers as features of holder 10 are similar or identical to the features described for holder 10. Holder 110 includes a housing 111 on which may be positioned an attachment device 136. Attachment device 136 may comprise a hook and loop arrangement similar to VELCRO that may be used to attach holder 110 to cloths, hats, and bags.

Figure 6:
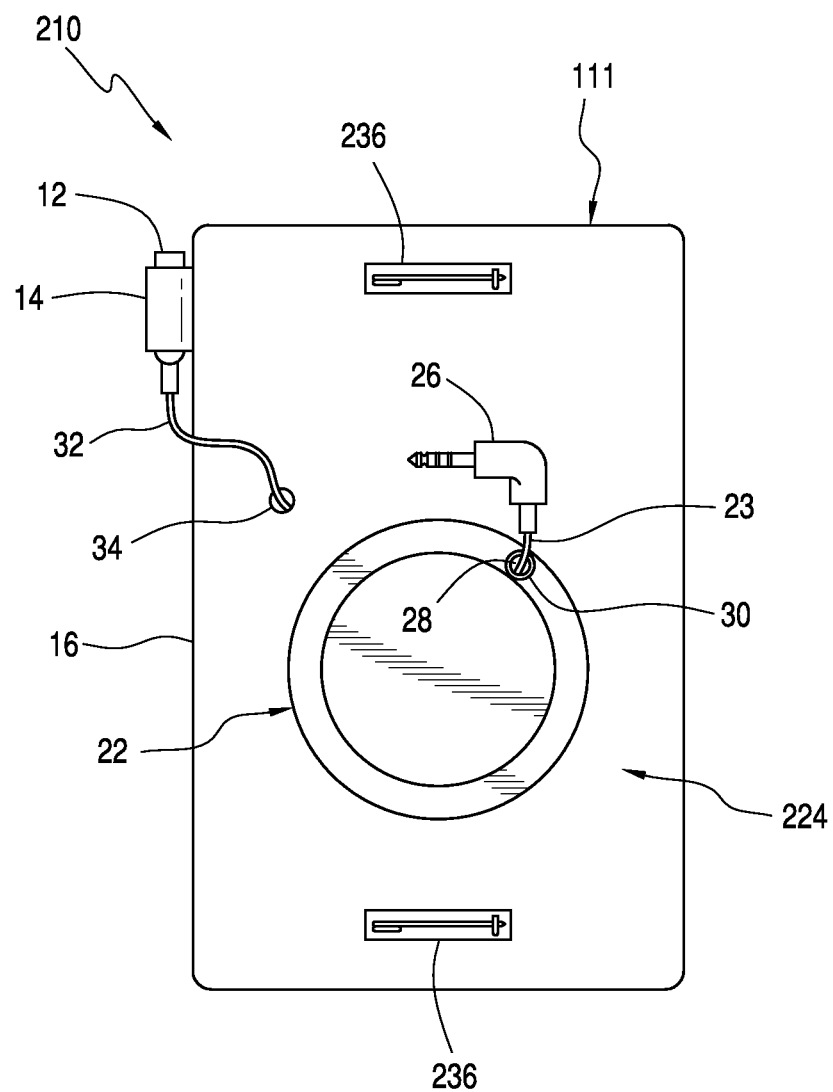
FIG. 6 is a back view of an embodiment of a holder in accordance with an exemplary embodiment of the present disclosure.

FIG. 6 shows a back view of a holder 210 with retractable cable assembly 22 embedded on a back 224 of holder 210. As with previous embodiments, connector 26 is located in a top-right position, and is attached to holder 210 by cable 23. Retractable cable 23 extends through assembly opening 28, which is surrounded by ring 30 to permit cable 23 to slide without interference. Headphone wire opening 34 is positioned on a left side of back 224, which allows headphone receiver 12 to be placed properly on the side of the holder 210. In this embodiment, attachment device 236 may be in the form of pins or other attaching mechanisms, which may be used to attach holder 210 to clothes, hats, and bags.

Figure 7:
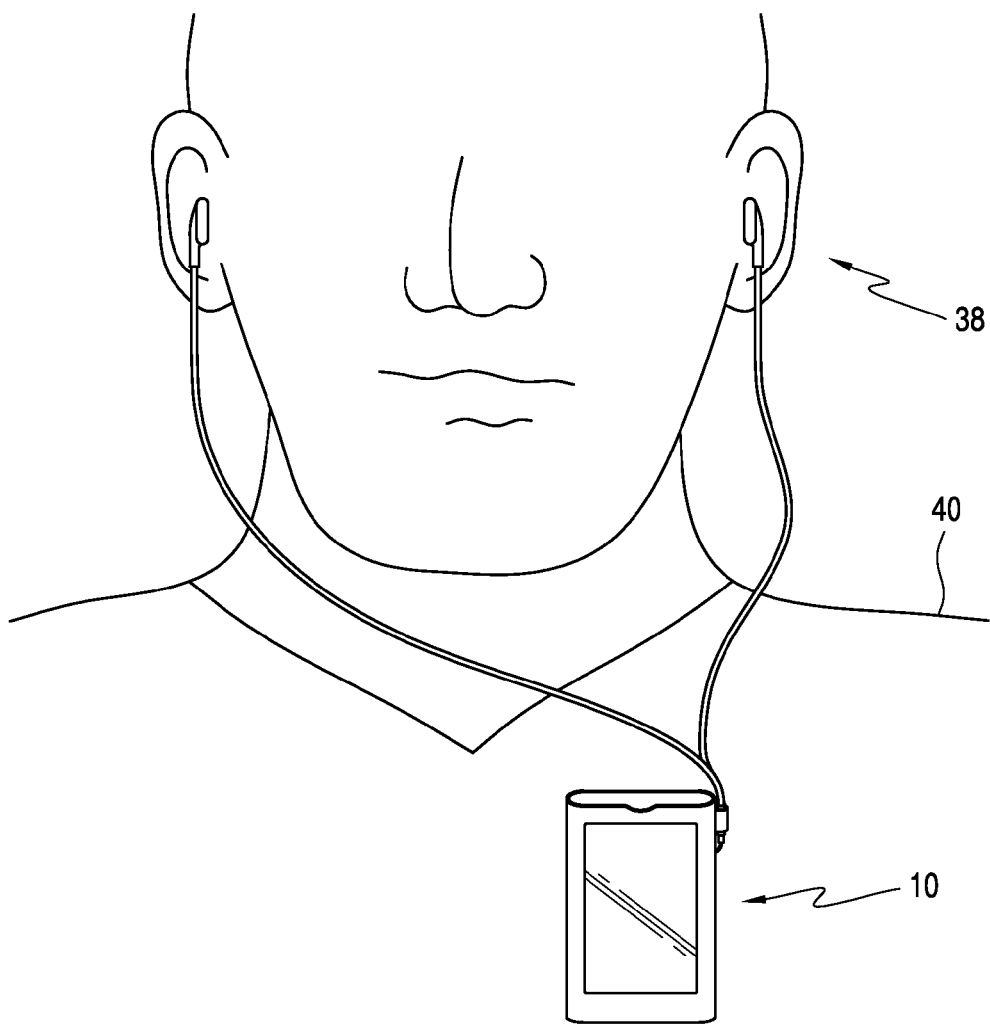
FIG. 7 is a front view of a user wearing the holder of FIG. 1 on a shirt in accordance with an exemplary embodiment of the present disclosure.

FIG. 7 is a front view of a user 30 wearing holder 10 on a shirt 40. Holder 10 is attached to shirt 40 by attachment device 36, 136, or 236, which may include pins, a hook and loop arrangement, or by other attaching mechanisms.

Figure 8:
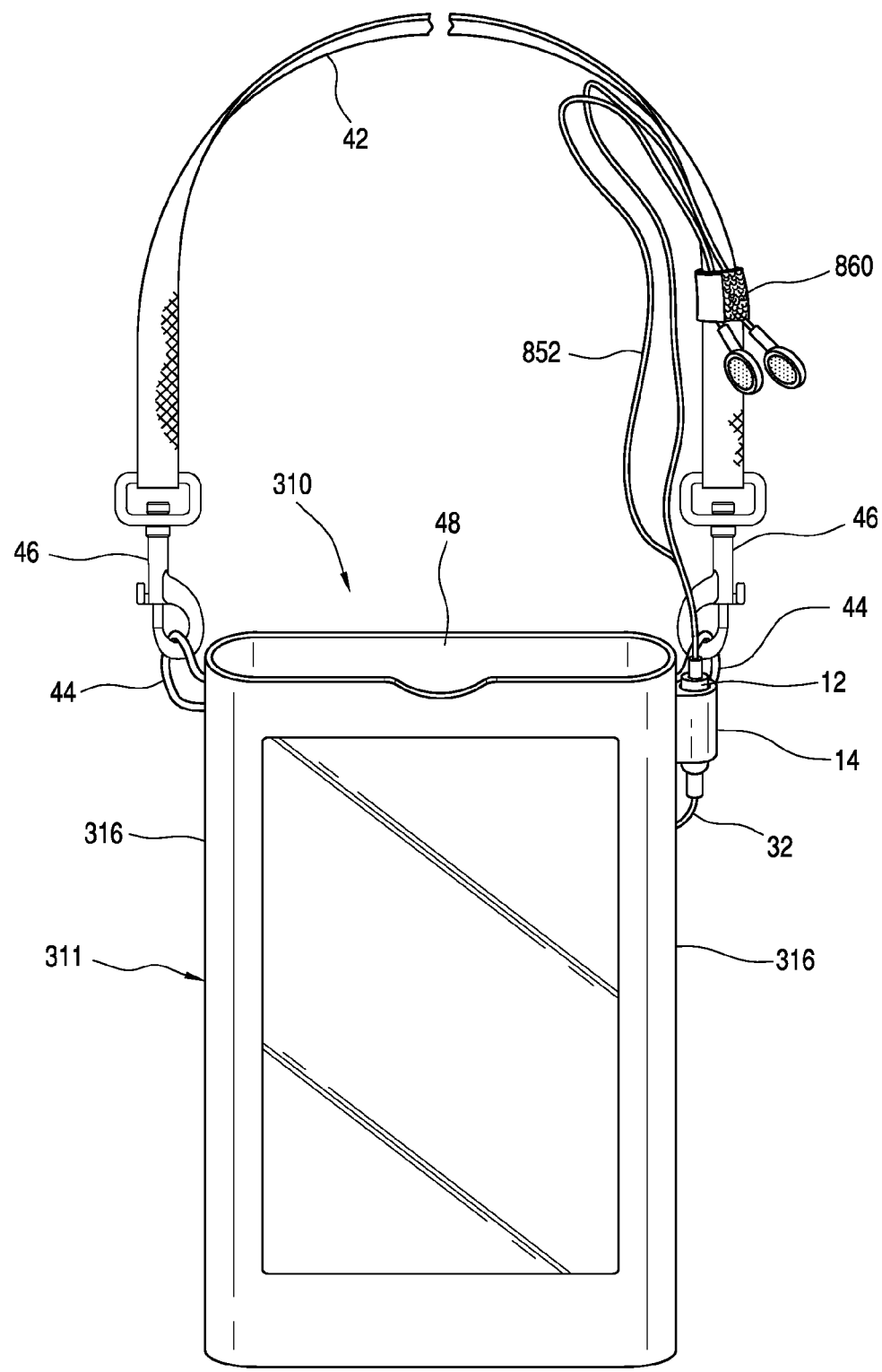
FIG. 8 is a front view of a holder with a strap in accordance with an exemplary embodiment of the present disclosure.
Figure 9:
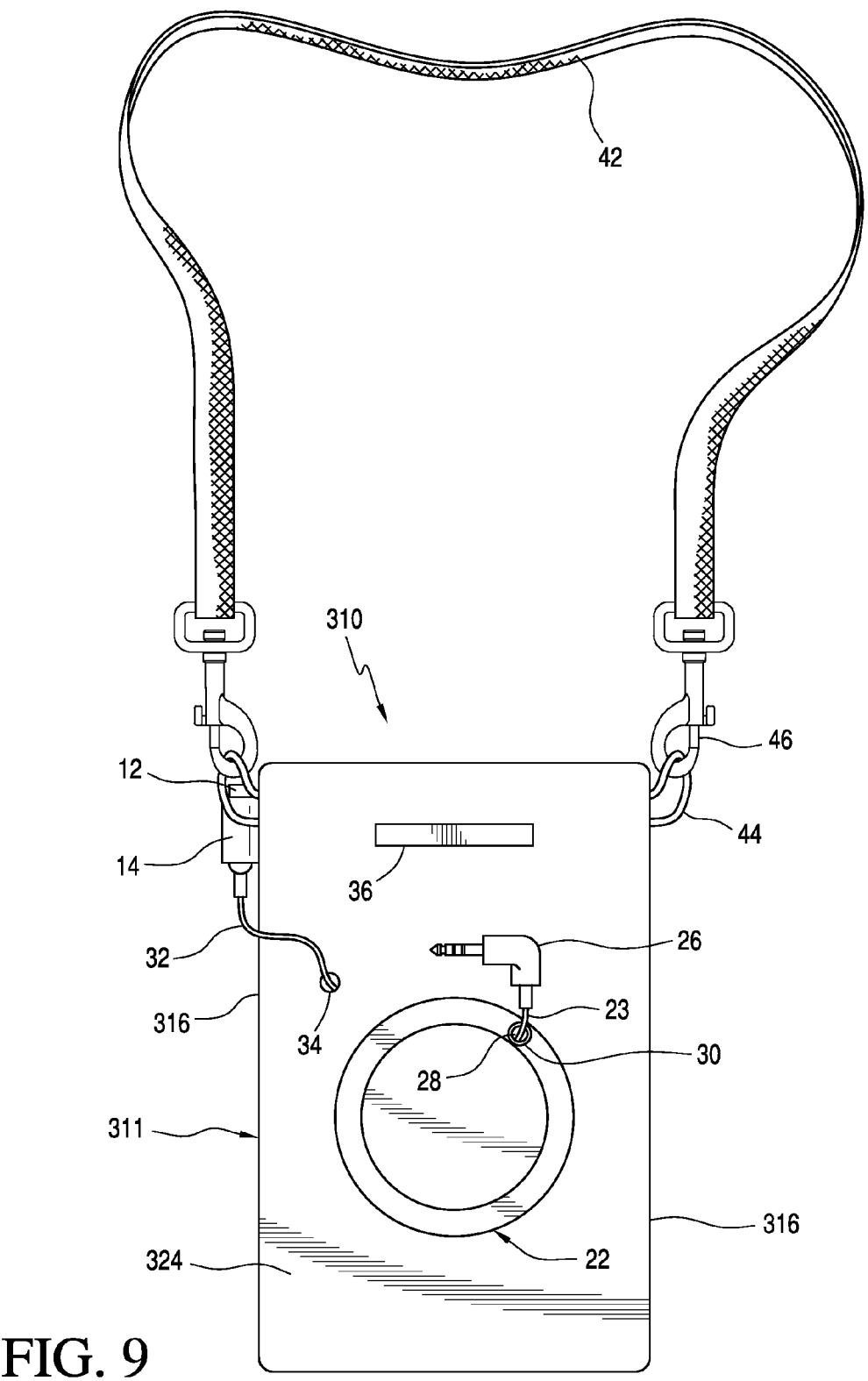
FIG. 9 is a back view of the holder of FIG. 8 in accordance with an exemplary embodiment of the present disclosure.
Figure 10:
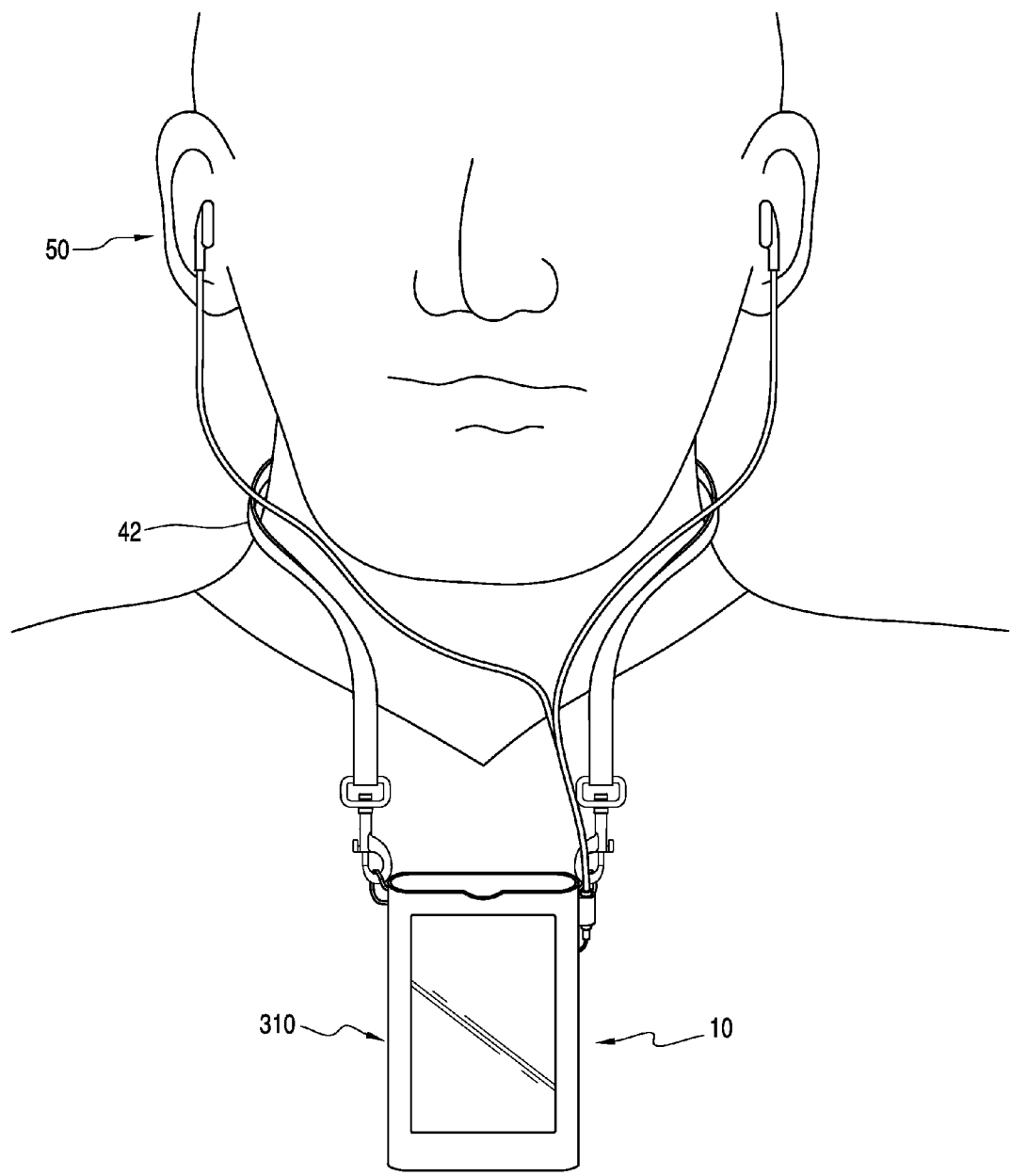
FIG. 10 is a front view of a user wearing the holder of FIG. 8.

FIGS. 8 and 9 show a perspective front view and back view of a holder 310, respectively, with a strap 42 that is worn by the user around the user's neck, in accordance with an exemplary embodiment of the present disclosure. Holder 310 includes a housing 311 on which are positioned eyes 44. Strap 42 includes hooks 46 that may be used to connect or attach strap 42 to holder 310. In the exemplary embodiment of FIG. 8, eyes 44 are located along sides or edges 316 of housing 311. However, eyes 44 may also be positioned or located on an upper side or edge 48 of housing 311, or in other locations that provide convenience for attaching hooks 46. Housing 311 also includes a back 324 on which is positioned an attachment device, which may be similar to attachment device 36, 136, or 236. Attachment device 36 prevents holder 310 from moving too much if the user is participating in vigorous activity. FIG. 10 shows a perspective front view of a user 50 wearing holder 310, secured around neck 52 of user 50 by strap 42.

FIG. 8 also includes a cloth or hook and loop piece 860, which may also be described as a retainer 860, which is permanently attached to strap 42. Retainer 860 is configured to hold headphone wires of a headphone, such as a headphone 660 or 852, described in more detail herein. Retainer 860 helps prevent headphones from just dangling, either when not in use or during use, which can become obtrusive and even dangerous for the user. Retainer 860 is shown in a position that captures headphones 852, which are held in place by frictional contact between retainer 860 and headphones 852.

Figure 11:
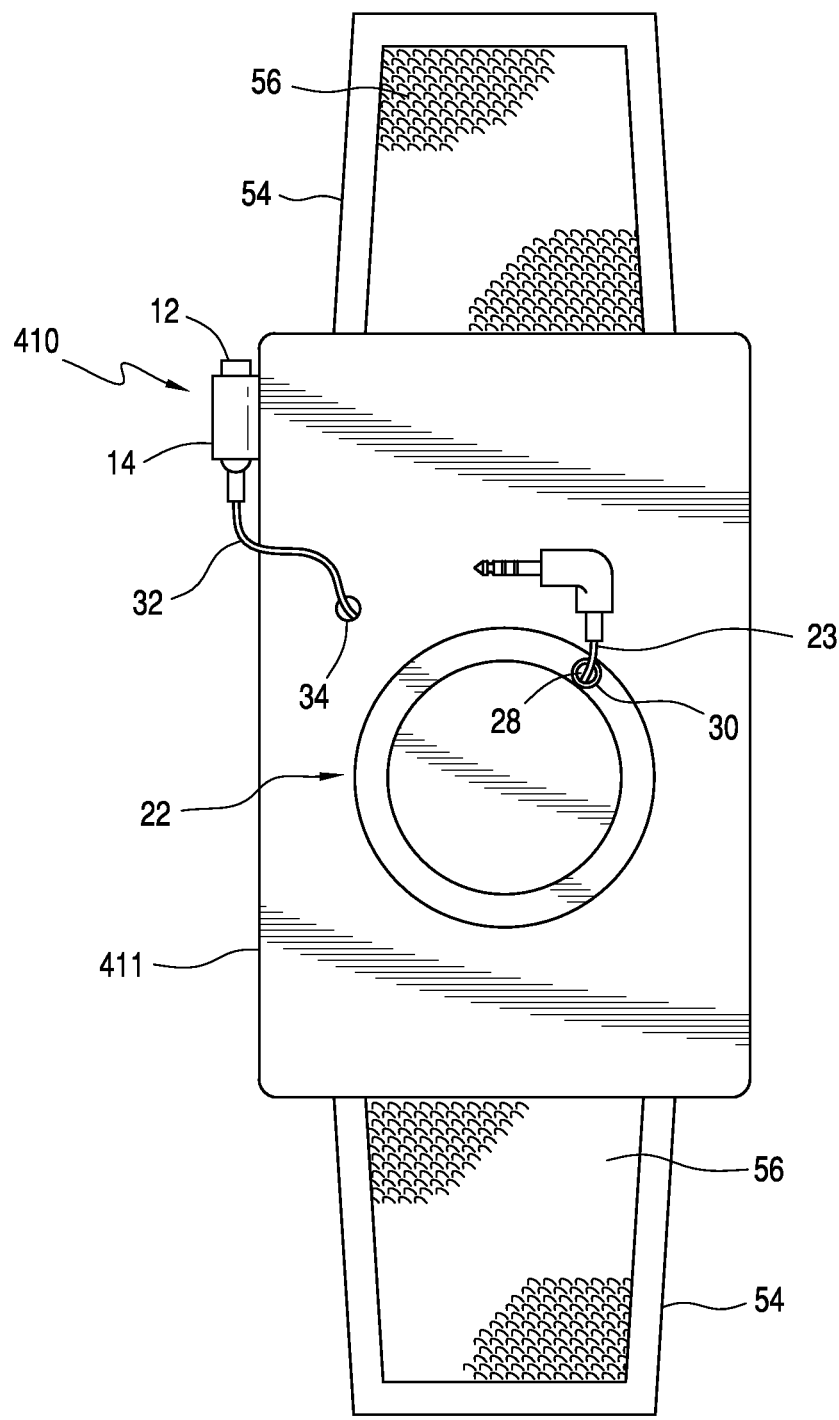
FIG. 11 is a back view of holder with elongated hook and loop straps on the top and bottom of the holder in accordance with an exemplary embodiment of the present disclosure.
Figure 12:
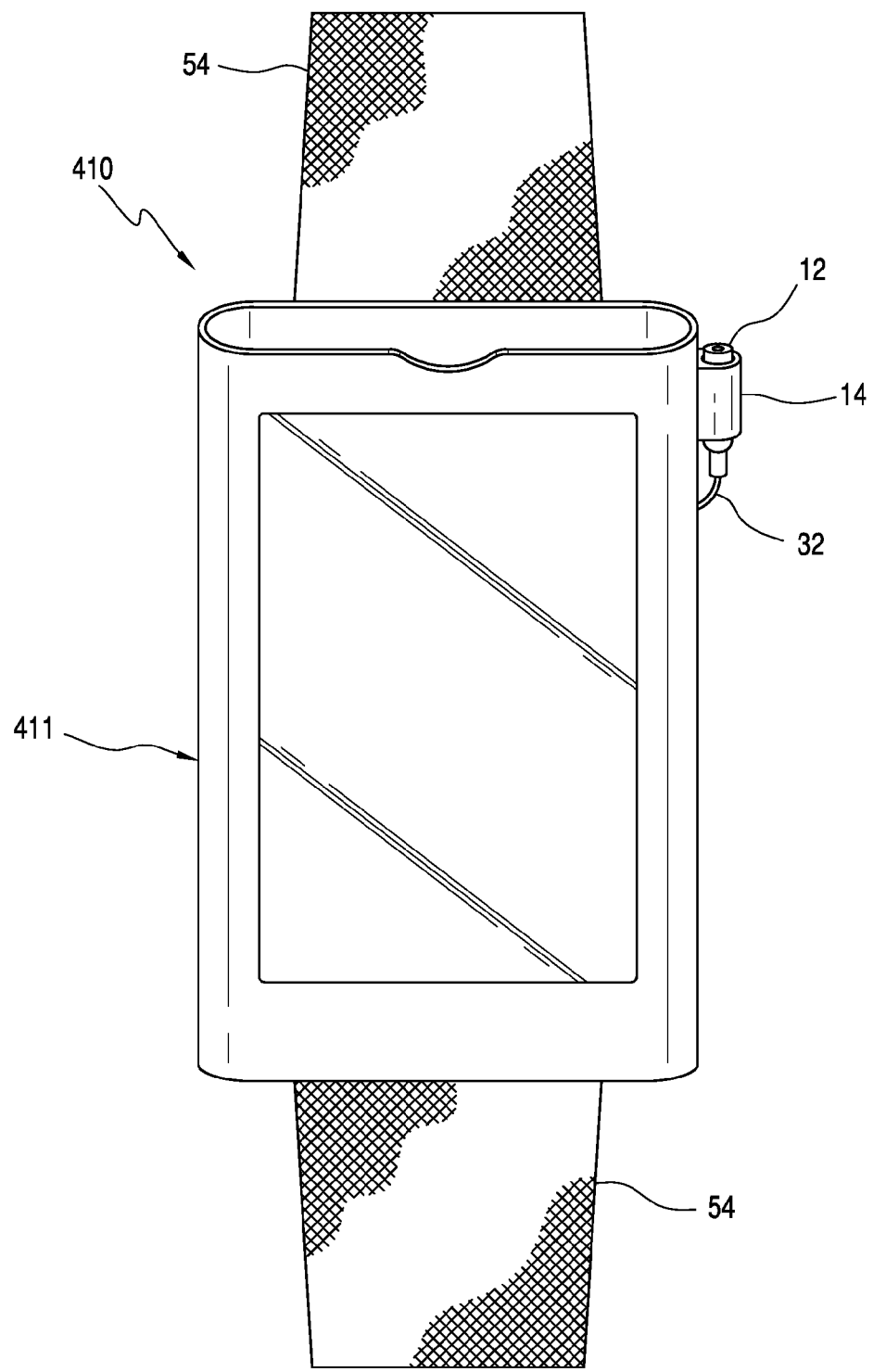
FIG. 12 is a front view of the holder of FIG. 11.
Figure 13:
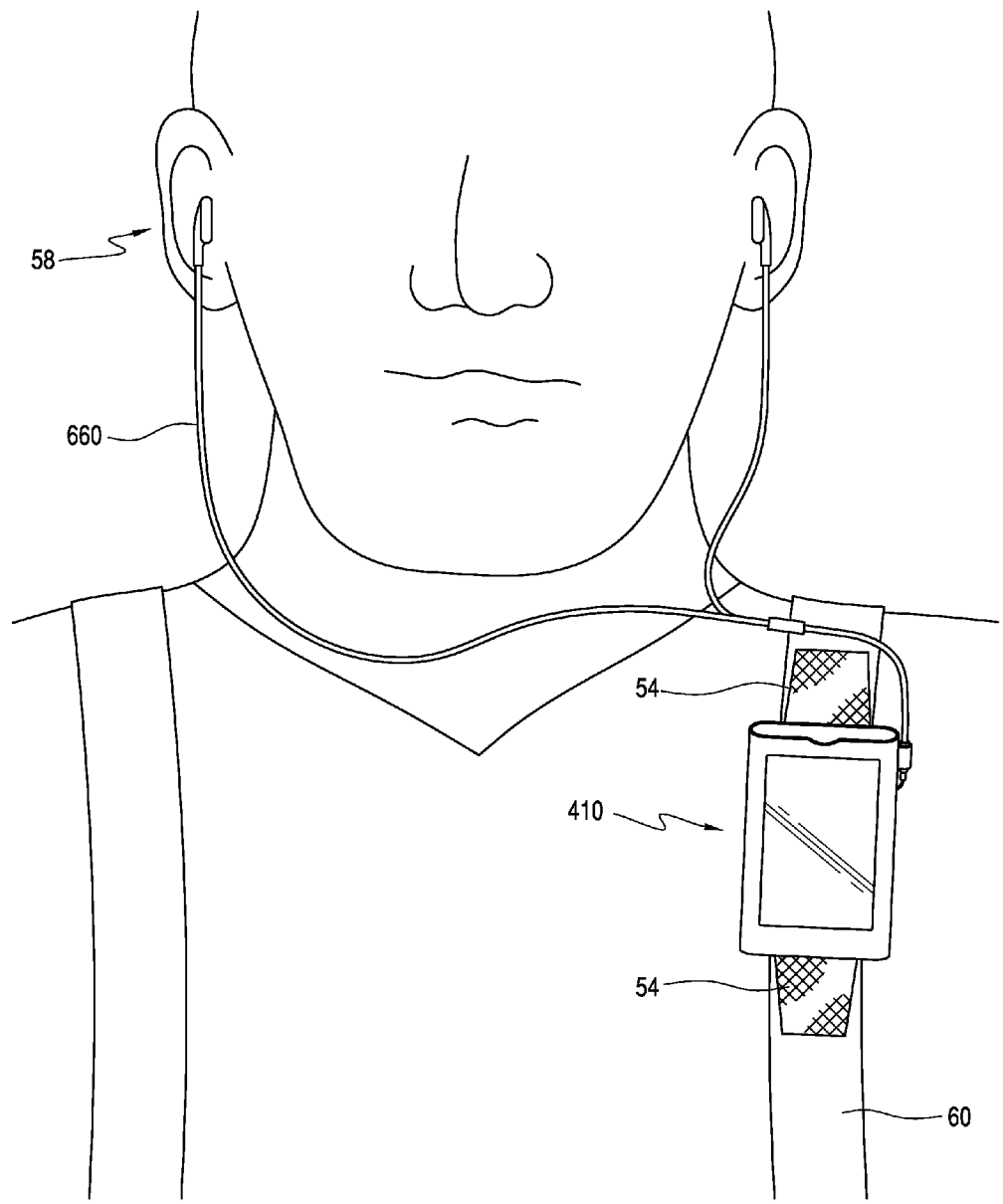
FIG. 13 is a front view of a user wearing the holder of FIG. 11 on backpack straps.
Figure 14:
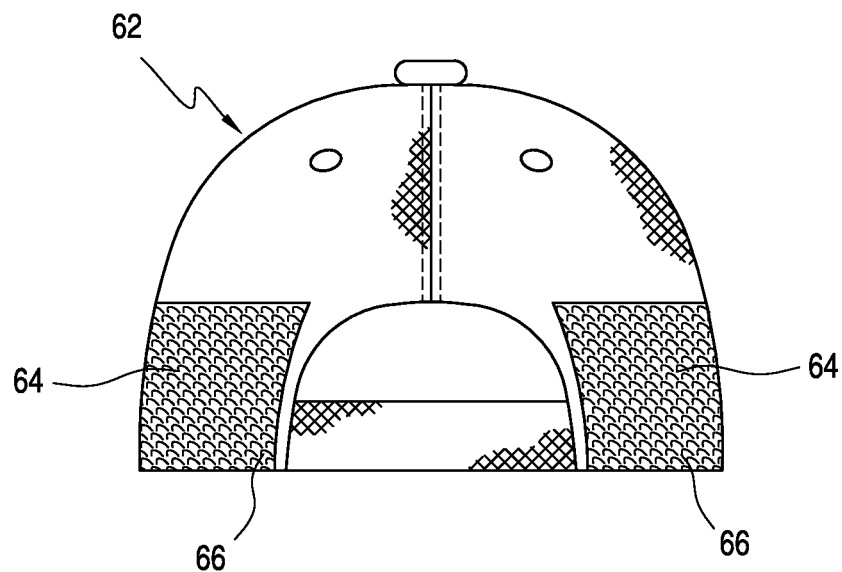
FIG. 14 is a back view of a hat with hook and loop fasteners for attaching a holder in accordance with an exemplary embodiment of the present disclosure.
Figure 15:
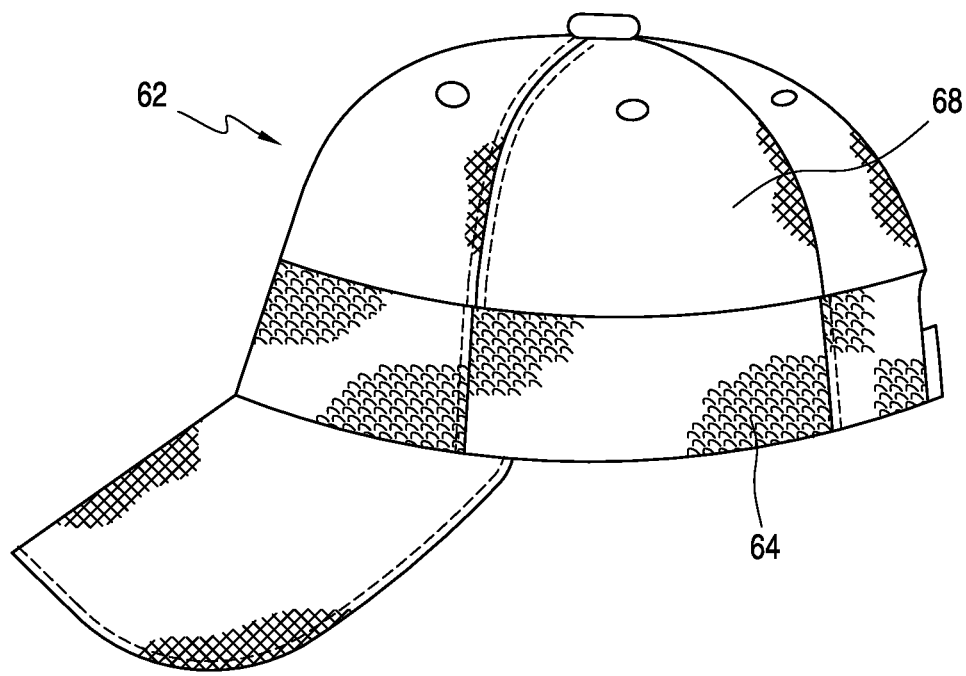
FIG. 15 is a side view of the hat of FIG. 14.
Figure 16:
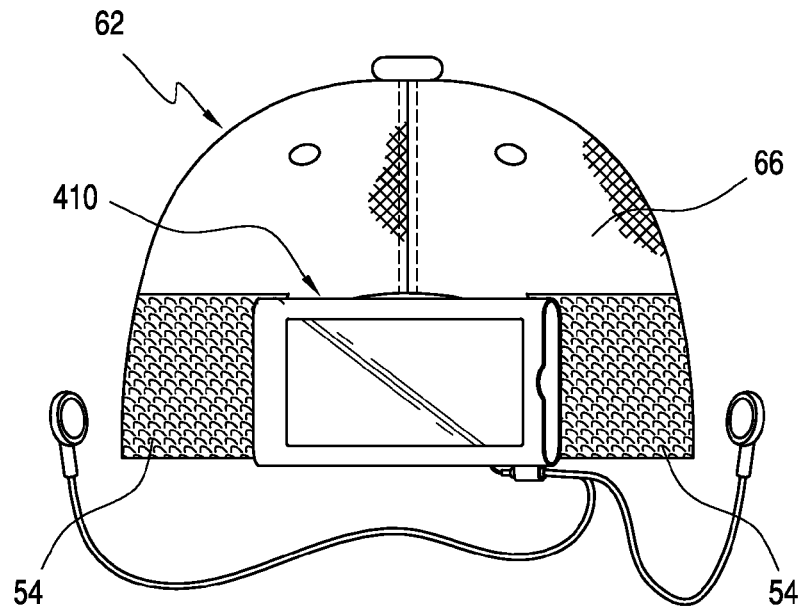
FIG. 16 is a back view of a hat with a holder attached in accordance with an exemplary embodiment of the present disclosure.
Figure 17:
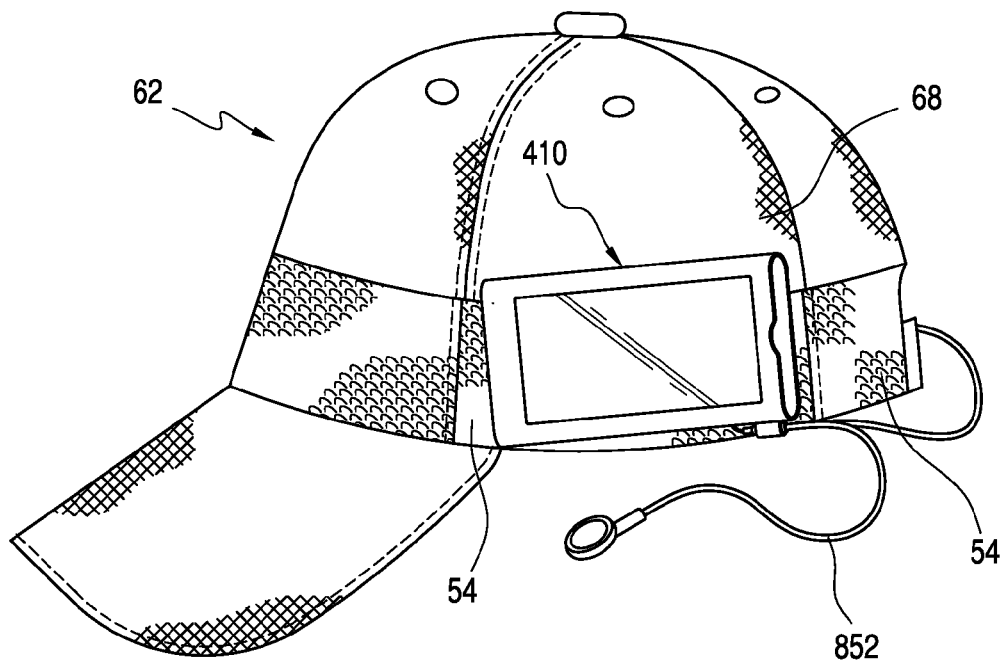
FIG. 17 is side view of the hat of FIG. 16.

FIGS. 11-13 show a holder 410, where features similar or identical to previously described features are provided with the same figure item numbers. Holder 410 includes a housing 411 on which are positioned, attached, or integrally formed extensions 54. Integrally formed extensions 54 may include a hook and loop attachment configuration 56 for attaching holder 410 to various clothing articles including, but not limited to, hats, shirts, and bags. FIG. 13 shows a front view of a user 58 wearing holder 410 attached to a strap 60, which may be a part of a backpack, suspenders, a travois, or other items that make use of such straps that extend downwardly from the shoulders of user 58. Because holder 410 is offset from a central, vertical longitudinal axis of user 58, headphones 852 having wires of different lengths are used to minimize excess wiring. Headphones 852 are described in more detail herein.

FIGS. 14-17 show a hat in accordance with an exemplary embodiment of the present disclosure and generally indicated at 62. Hat 62 includes one or more hook and loop portions 64 that may be used as an attachment location for holder 410, which has mating hook and loop portion 56. Hook and loop portions 64 may be located on a back portion 66, a side portion 68, or other area of hat 62.

Figure 18:
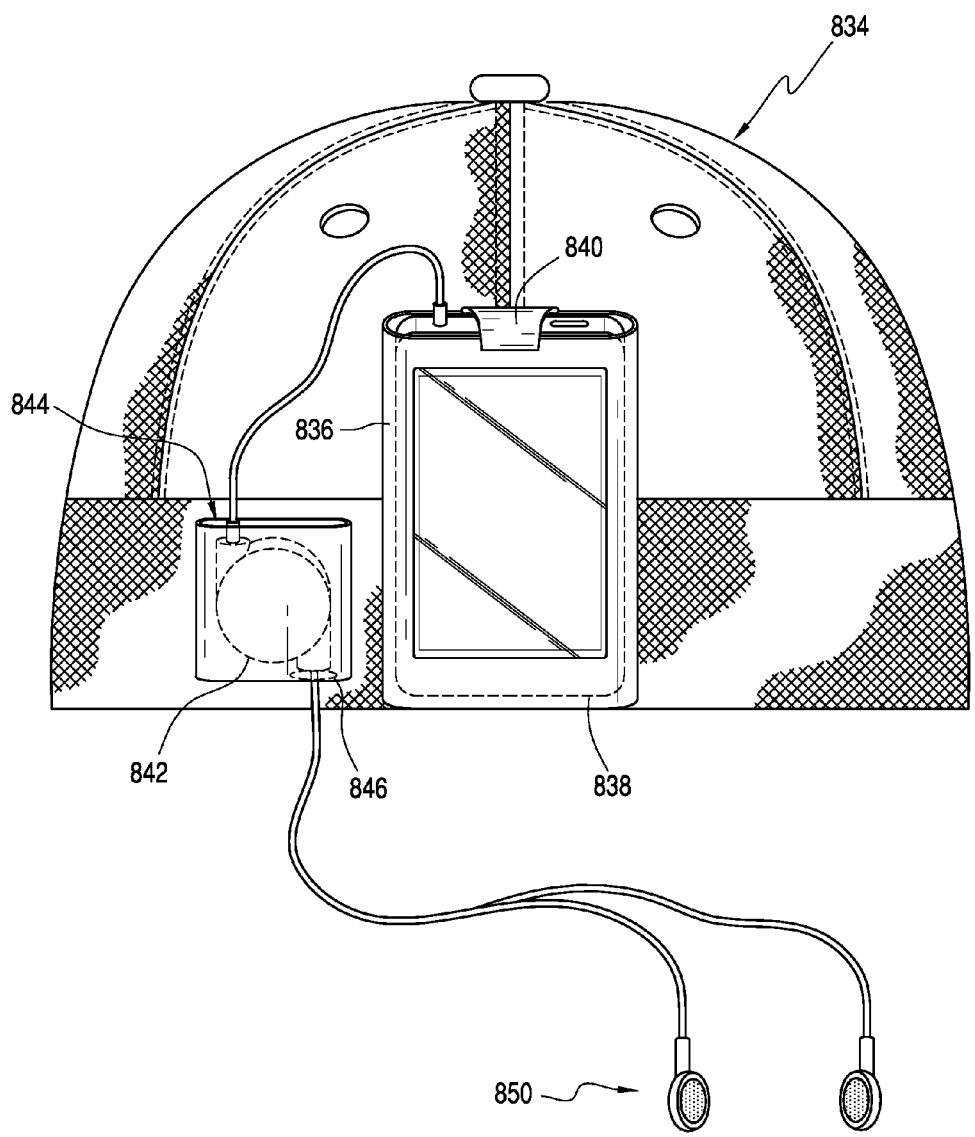
FIG. 18 is a view of a hat and holder in accordance with an exemplary embodiment of the present disclosure.

FIG. 18 shows a perspective back view of a hat 834 having a holder in accordance with an exemplary embodiment of the present disclosure. Hat 834 includes a built-in pocket 836 for an electronic device 838. Built-in pocket 836 may include a flap 840 on the top that adheres to a hook and loop or other attaching mechanisms to secure electronic device 838 therein. A retractable cord spool 842 is built-in within hat 834, and is associated with openings 844 and 846. Top opening 844 is used to connect a cable 848 to electronic device 838. Bottom opening 846 is used to connect headphones or ear buds 850.

Figure 19:
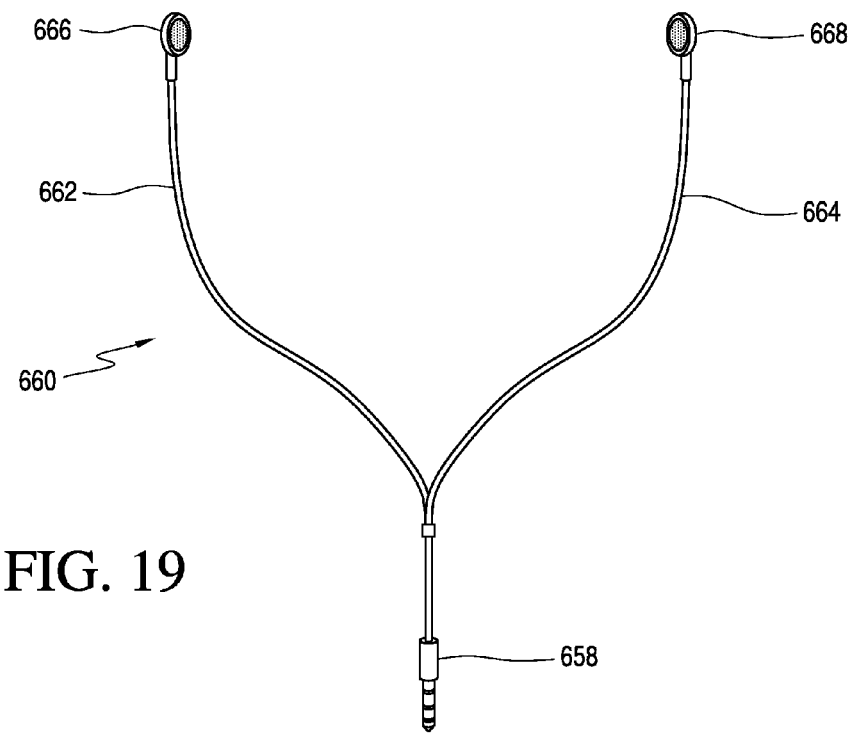
FIG. 19 is a view of headphones in accordance with an exemplary embodiment of the present disclosure.

As described herein, headphones are frequently used with various embodiments of the present disclosure. FIG. 19 shows a front perspective of headphones 660 with a left wire 662 and a right wire 664 of approximately identical length. The overall length of headphones 660 in an exemplary embodiment is equal to or less than 60 cm, and in another preferred exemplary embodiment, is equal to or less than 40 cm, and in yet another most preferred exemplary embodiment, and is equal to or less than 20 cm. The preferred length of wire of headphones 660 ranges from 20 cm to 60 cm. Attached at a first end of headphones 660 are a left ear bud 666 and a right ear bud 668 for listening. Attached at a second, opposite end of headphones 660 is a connector 658, which is configured to mate with another connector on an associated electronic device. The length of the headphones 660 is designed to eliminate excess length for use with a cellular phone being housed in the holder, which makes the headphones unobtrusive, convenient, and safer for the user, since the shorter length reduces the chance for headphones 660 to be caught on objects during movement of the user. Headphones 660 are specifically designed for configurations where an associated electronic device is positioned equidistant, or approximately equidistant, from both ears of the user, such as the configuration shown in FIG. 10. The configuration of headphones 660 allows the user to be tangle free and helps to reduce exposure to radiation from an associated electronic device, as shown in FIGS. 7, 10, and 13, by the electronic device, such as a cell phone, being positioned away from the ear canal, an opening to the brain and the area of highest risk for radiating the brain and developing cancer.

Figure 20:
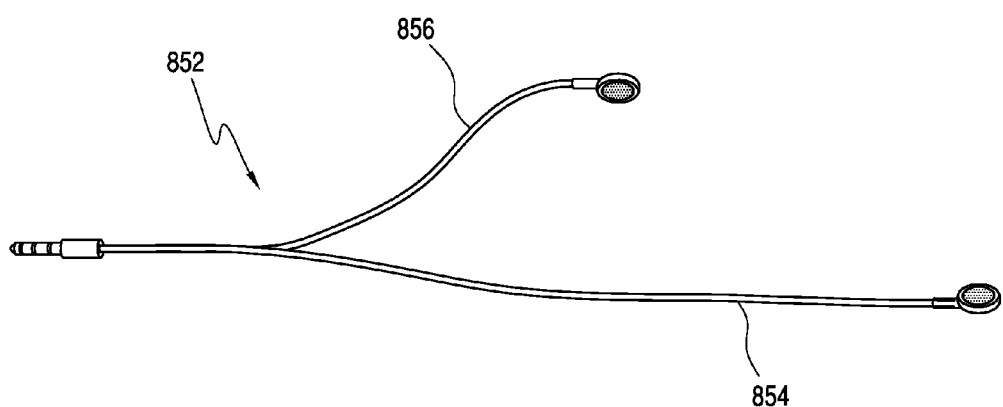
FIG. 20 is a view of headphones in accordance with an exemplary embodiment of the present disclosure.

FIG. 20 shows a perspective view of specialized headphones 852 used with the holder. With these headphones 850, one side (wire) 854 is longer than the other side (wire) 856. The length of shorter side (shorter wire) 856 in an exemplary embodiment is ≤45 cm, and is preferably ≤30 cm and is most preferably ≤20 cm. The length of the longer side (longer wire) 854 in an exemplary embodiment is in the range of 15 cm to 30 cm longer than shorter side (short wire) 856. Headphones 852 have a different length on each side because users usually wear a holder 858 on either side of their body and not in the middle, as shown in FIGS. 13, 17, 21, and 22. It is understood that even when user wears holder in the middle of the body, overlaying the heart region and end of the sternum, such as shown in FIG. 10, wires of dissimilar lengths can be used, in which one side a shorter wire is disposed in one ear and the second wire (longer wire) is disposed behind the neck to reach the opposite ear.

While the lengths of longer and shorter sides 854 and 856 are most optimized with a ratio of lengths in a specific range of lengths. The ratio of longer to shorter lengths in an exemplary embodiment is 5:2 when the length of longer side 854 is approximately 50 cm and the length of shorter side 856 is approximately 20 cm. However, the ratio can range from about 1.25:1 to about 3:1, depending on the length of each side. It should be noted that as the lengths of the wires increases, the ratio decreases. The lengths of the earphones are designed to eliminate excess length when used with the holder of the present invention housing a cellular phone with ear phone, which makes the earphones less obtrusive, convenient, and safer for the user. Additionally, headphones 852 reduce the chance of tangles as the user moves and helps avoid radiation from an associated electronic device, such as holder 858.

FIG. 20 shows a perspective view of specialized headphones 852 used with the holder. Headphones 852 have a different length on each side because users usually wear a holder 858 on either side of their body and not in the middle, as shown in FIGS. 13, 17, 21, and 22. The lengths of the earphones are designed to eliminate excess length when used with a cellular phone, which makes the earphones less obtrusive, convenient, and safer for the user. Additionally, headphones 852 reduce the chance of tangles as the user moves and helps avoid radiation from an associated electronic device, such as holder 858.

When the holder is used in the middle of the body, at the level of the heart and lower part of the sternum, as shown in FIG. 10, and when one wire is disposed behind the neck, as described elsewhere herein, wires of particular dissimilar lengths are used. Exemplary preferred dimensions in this embodiment are 33 cm for the shorter wire and 65 cm for the longer wire, with a range of plus or minus 15 cm for both the longer wire and the shorter wire.

Figure 23:
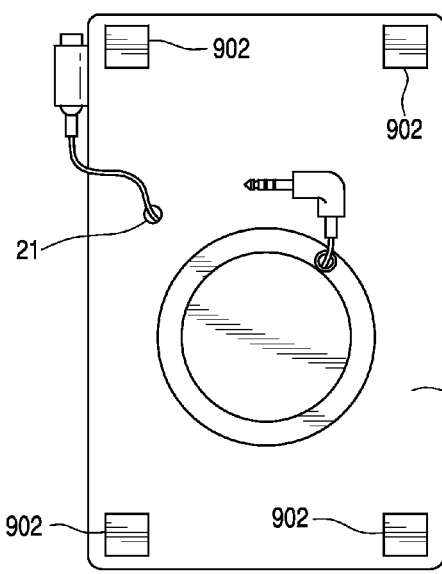
FIG. 23 is a back view of a holder in accordance with an exemplary embodiment of the present disclosure.
Figure 24:
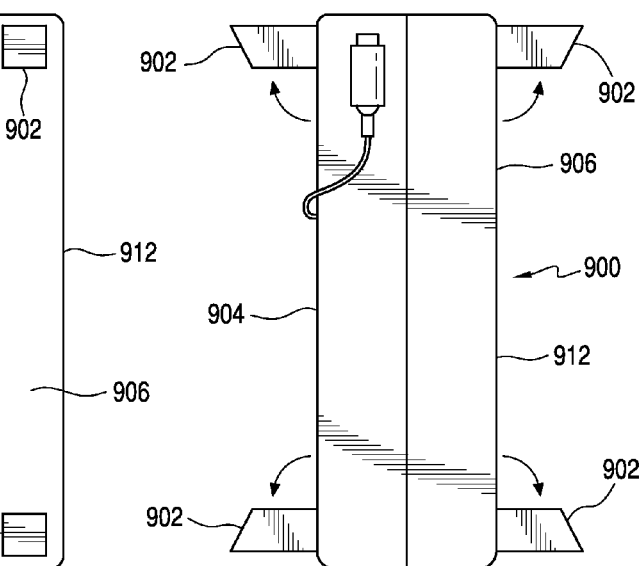
FIG. 24 is a side view of the holder of FIG. 23.
Figure 25:
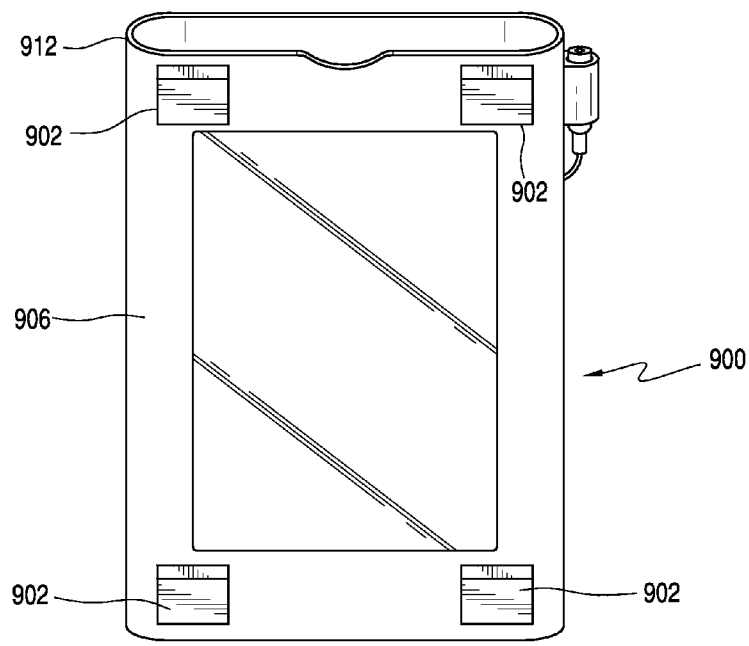
FIG. 25 is a front view of the holder of FIG. 23.
Figure 26:
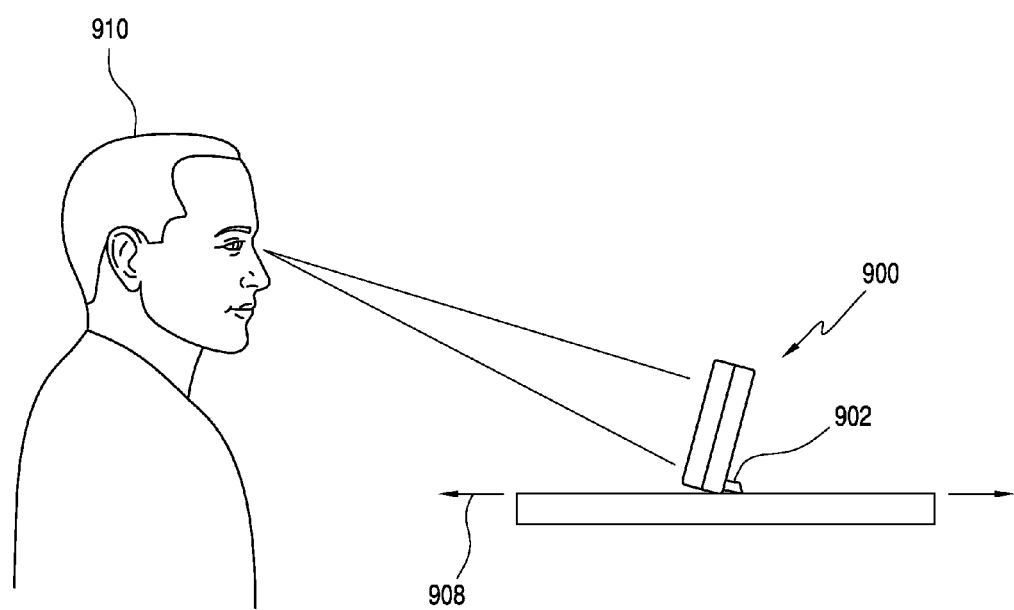
FIG. 26 is a view of the holder of FIGS. 23-25 configured to be in an upright position for viewing by a user.

FIGS. 23-25 show a holder in accordance with an exemplary embodiment of the present disclosure and indicated generally at 900. Holder 900 includes a plurality of arms 902 on a back side 904 and a front side 906 that extend outwardly and which allow holder 900 to be positioned in a vertical or standing orientation; i.e., arms 902, when opened as shown in FIG. 24, permit holder 900 to extend perpendicular to a horizontal axis such that back 904 and front 906 face in directions that are approximately parallel to a horizontal plane 908, such as that shown in FIG. 26. Arms 902 allow user 910 to watch holder 900 hands-free, as shown in FIG. 26. Additionally, arms 902 are sized and dimensioned to provide sufficient distance to decrease the exposure of user 910 to radiation substantially if user 910 is talking on holder 900 when holder 900 houses a cellular phone. Cellular phones generate RF energy through an antenna that is generally internal to the cell phone, and most such phones are held close to the side of the user's head when in use. The closer holder 900, and the antenna of a cell phone is to the head of user 910, the greater the exposure of user 910 to RF energy. The amount of RF energy absorbed by user 910 decreases significantly with increasing distance between holder 900 and user 910. The length of arms 902 in an exemplary embodiment is in the range of 30 mm to 35 mm. In another exemplary embodiment, the length of arms 902 is in the range of 25 mm to 35 mm. In yet another exemplary embodiment, the length of arms 902 is in the range of 10 mm to 25 mm. Each of these lengths is configured to decrease the exposure of user 910 to potentially harmful RF radiation.

In the exemplary embodiment of FIGS. 23 and 24, each arm 902 pivots on a hinge that is internal to holder 900, which is not visible. Each arm 902 is provided with two locked positions. The first locked position is shown in FIG. 23, where each arm 902 is stored or stowed to avoid protrusion of arm 902 from a housing 912 of holder 900. The second locked position is shown in FIG. 24, where each arm 902 can be locked into the open position shown in FIG. 24. By being locked into the position shown in FIG. 24, arms 902 improve the stability of holder 900 when in the upright, vertical, or standing position shown in FIGS. 24 and 26. The locked positions may be established by a frictional engagement of each arm 902 with a feature of holder 900, such as an over-center mechanism, a releasable lock, or other feature that maintains the positions of each arm 902 as shown in FIGS. 24 and 26.

Figure 27:
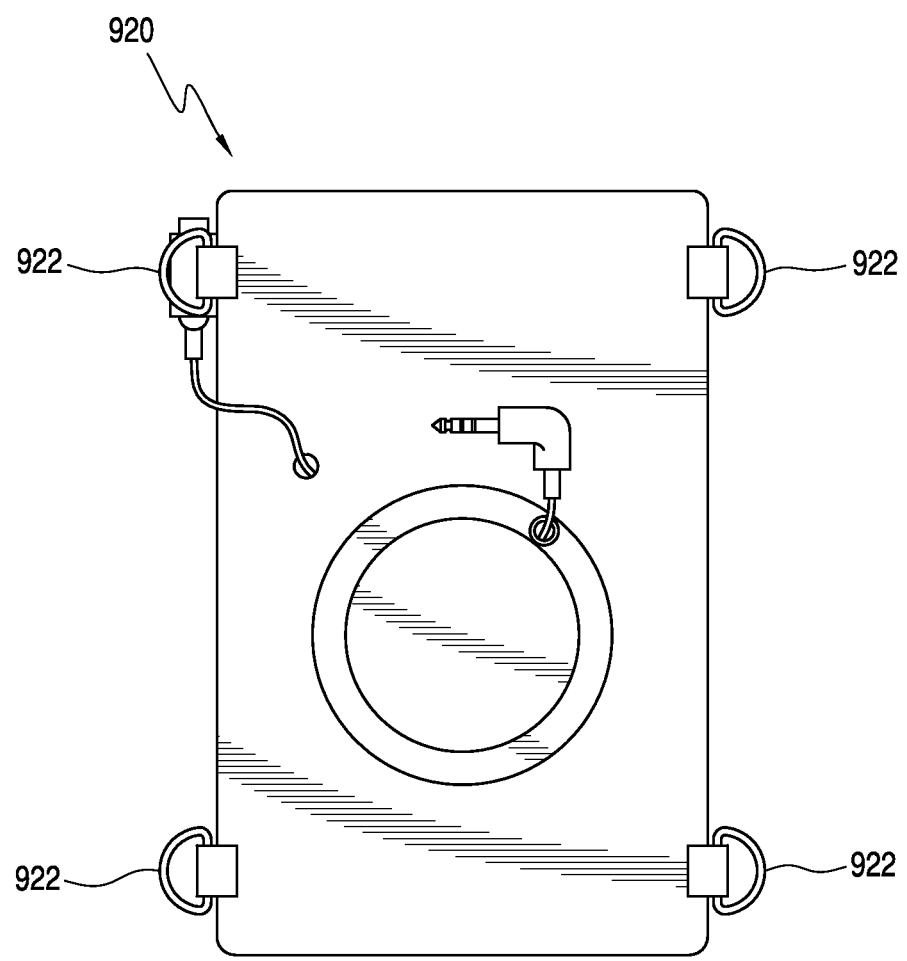
FIG. 27 is a view of a holder in accordance with an exemplary embodiment of the present disclosure.
Figure 28:
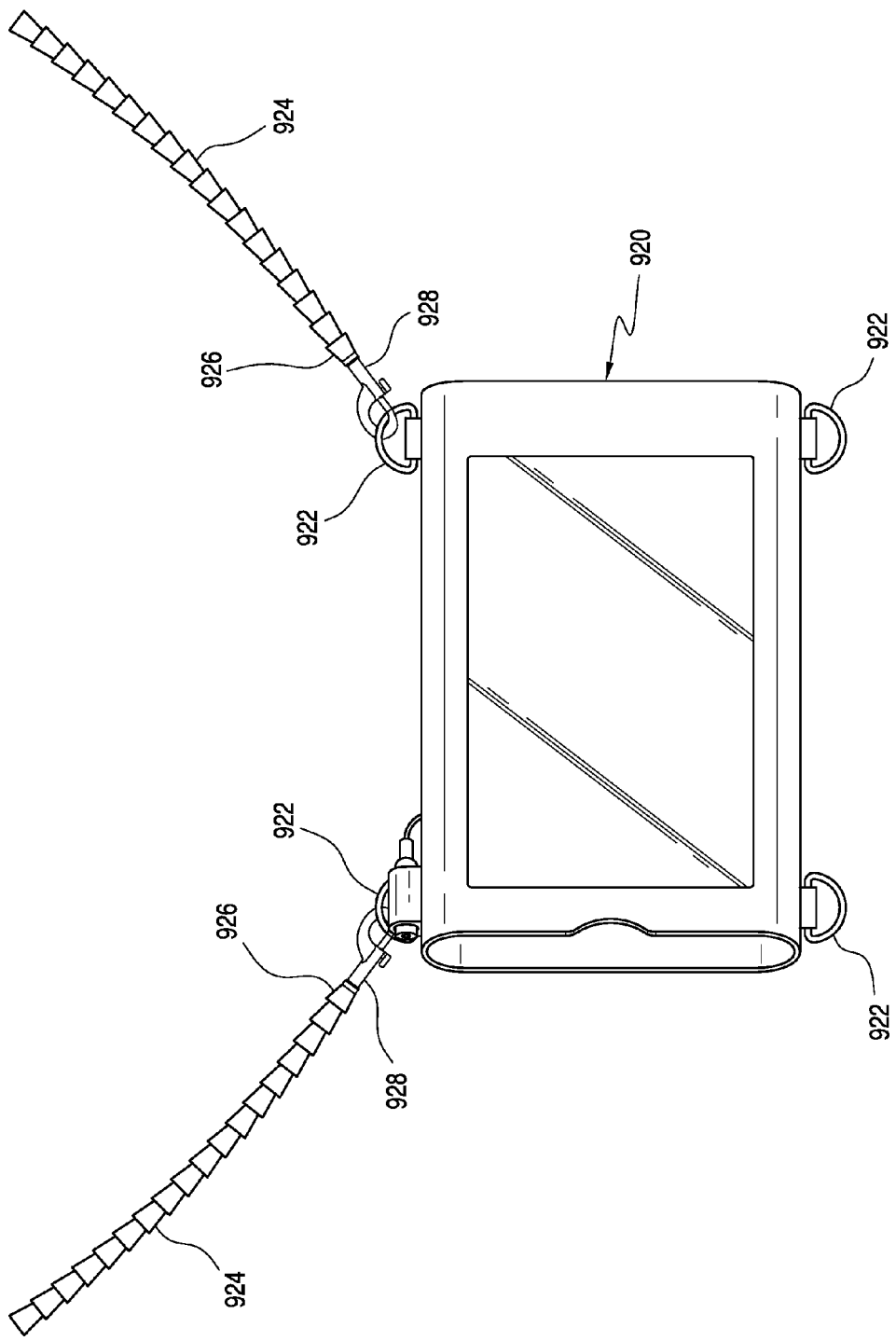
FIG. 28 is a view of the holder of FIG. 27 with flexible arms in accordance with an exemplary embodiment of the present disclosure attached to the holder.

FIG. 27 shows a back view of a holder in accordance with an exemplary embodiment of the present disclosure and generally indicated at 920. Holder 920 includes a plurality of anchors 922, and, in the exemplary embodiment of FIG. 27, one anchor 922 is positioned on each of the corners of holder 920. Anchors 922 can be attached to another device, mechanism, or apparatus, such as one or more flexible arms 924 shown in FIG. 28. Flexible arms 924 are configured to retain a position, once arm 924 is positioned by a user. Such positions may form a shape. An arm end 926 of each flexible arm 924 may be configured to include an attachable feature, such as hooks 928. By providing anchor 922 in each of the four corners of holder 920, a user is able to attach a device, mechanism, or apparatus, such as flexible arms 924, in a plurality of orientations, such as those shown in FIGS. 29-32.

Figure 29:
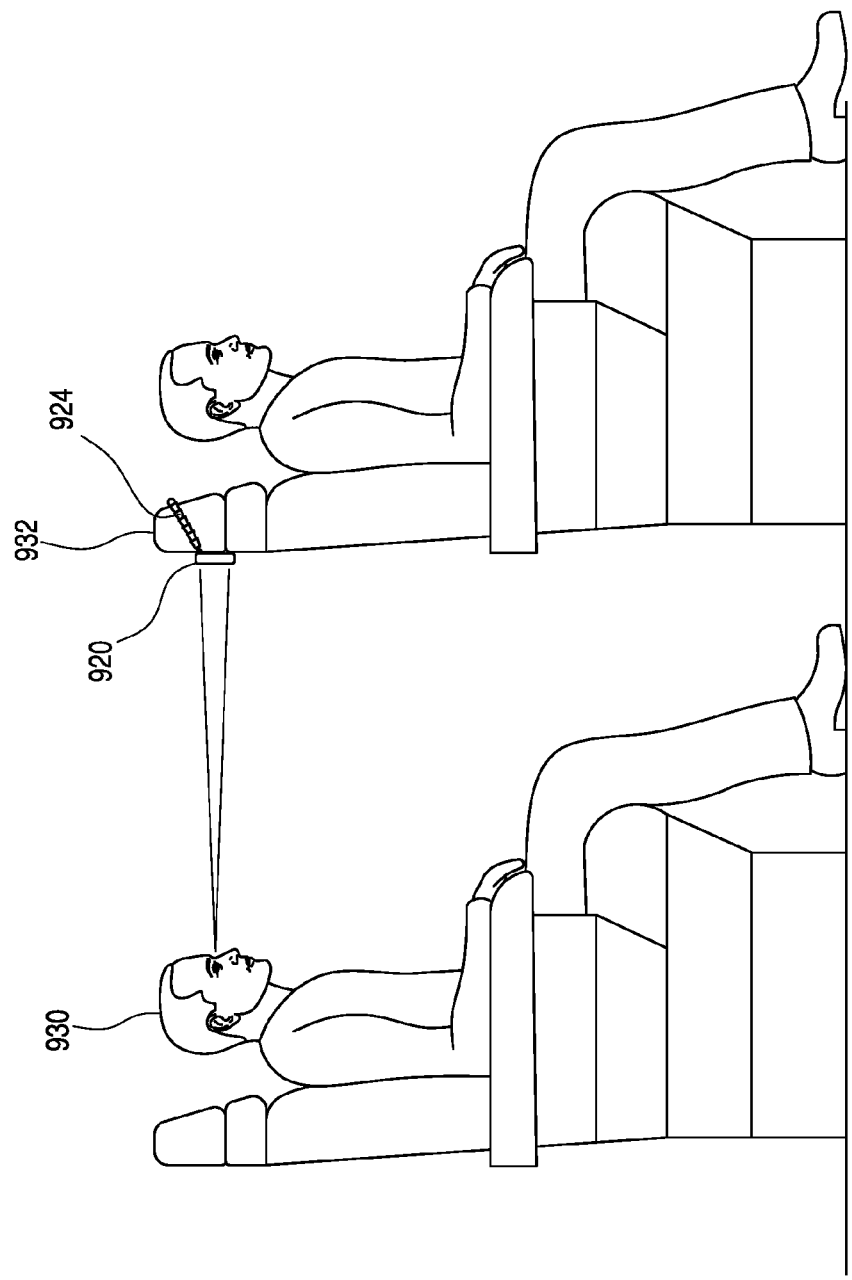
FIG. 29 is a view of the holder of FIG. 28 positioned on a seat headrest.
Figure 31:
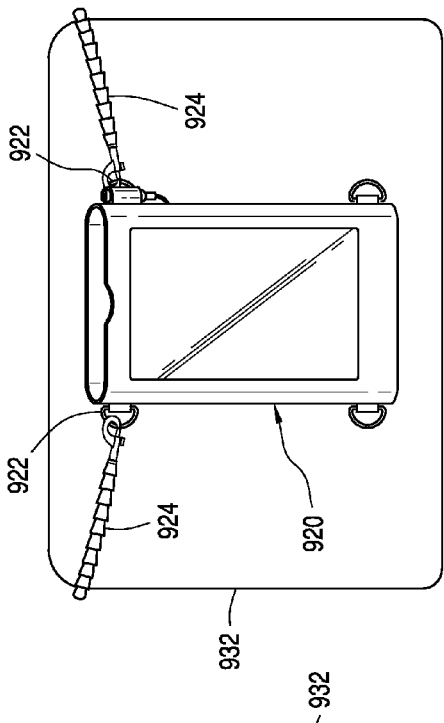
FIG. 31 is a view similar to FIG. 30, with the holder in a different orientation.
Figure 32:
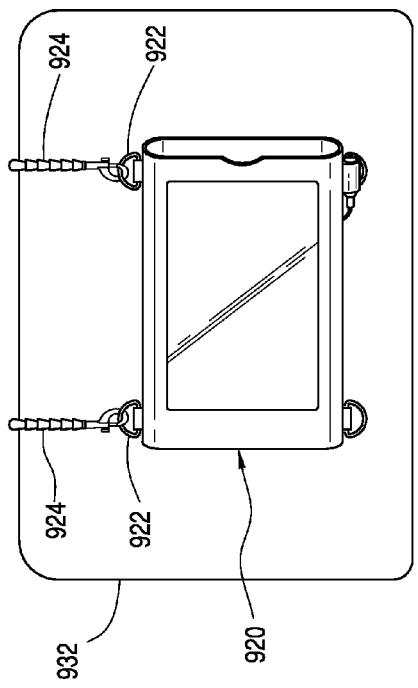
FIG. 32 is a view similar to FIGS. 30 and 31, with the holder in yet another orientation.
Figure 30:
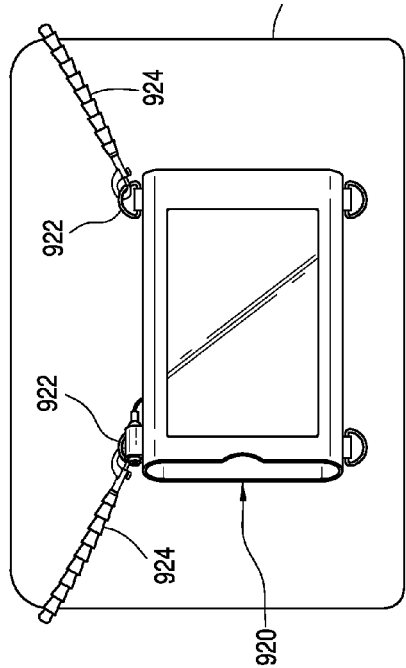
FIG. 30 is another view of the holder of FIG. 28 positioned on the seat headrest of FIG. 29.
Figure 33:
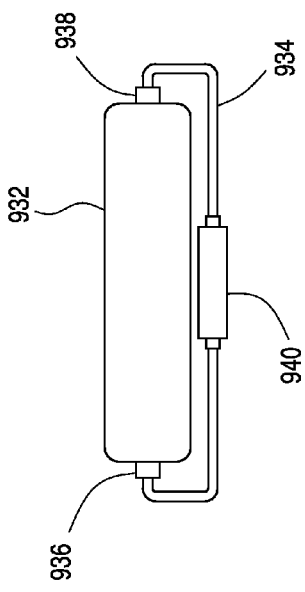
FIG. 33 is a view of an anchoring system for a holder in accordance with an exemplary embodiment of the present disclosure.

FIG. 29 shows a user 930 who has anchored holder 920 on a back portion of a chair's headrest 932 with flexible elongated arms 924 positioned to grasp sides of headrest 932. Flexible elongated arms 924 are able to clamp the sides of headrest 932 because arms 924 are able to retain a desired shape and position. Alternatively, flexible elongated arms 902 can wrap around headrest 932 or hook above headrest 932, as shown in FIG. 32. This embodiment allows the user to sit comfortably in a seat with the display of cell phone in holder being aligned with the eyes of the user, instead of the user looking down and straining the neck while holding the cell phone with hands. FIG. 33 shows an exemplary anchoring system comprised of a C-clamp 934 connected to a holder 940 and anchored to a chair headrest 932, said C-clamp having right and left pads 936, 938 for applying pressure and to position the C-clamp in place.

Headrest 932 is chosen as an illustration and not a limitation to the scope of the present disclosure. Flexible elongated arms 924 can grasp or hang from many structures because of the flexibility of arms 924 and the ability of arms 924 to retain the desired shape and position. Elongated arms can include a series of configurations and materials, and by way of example, telescopic arms, gooseneck arms, C-clamp arms, and the like and may include a variety of pressure mechanisms and springs for anchoring holder to an article of manufacturing such as chair head rest.

While various embodiments of the present disclosure have been shown and described, it should be understood that these embodiments are not limited thereto. The embodiments may be changed, modified, and further applied by those skilled in the art. Therefore, these embodiments are not limited to the detail shown and described previously, but also include all such changes and modifications.

I claim:
1. A system for holding an electronic product, the system being configured to be positioned on a wearable article of a user, the system comprising:
   a housing configured to contain the electronic product,
   the housing including a headphone receiver,
   the headphone receiver being secured to the housing,
   an attachment device secured to the housing and configured to mount the housing around the neck of a user,
   a retractable cable assembly positioned on the housing for connection only to the electronic product by an audio jack, and headphones including a connector for electrical connection to the headphone receiver with the headphones extending from the headphone receiver, the headphones including a first ear bud attached to the the connector by a first wire, and a second ear bud attached to the the connector by a second wire.

2. The system of claim 1, wherein the attachment device includes a strap configured to attach to the housing and to secure the housing to the user wearable article.

3. The system of claim 1, wherein the housing is positioned on a strap in a transversely offset location from a central axis of the user.

4. The system of claim 1, wherein the wearable article is a shirt, and the housing is positioned on the shirt.

5. A wearable electronic device comprising:
a wearable article including a pocket for housing an electronic device;
a headphone receiver secured to the wearable article;
a retractable cable assembly positioned on the wearable article for connection only to the electronic device;
a mounting device for mounting the wearable article with respect to a user, the mounting device being secured to the wearable article;
a first cable connecting the retractable cable assembly only to the electronic device; and
at least one ear bud connected to the headphone receiver by a second cable.

6. The wearable electronic device of claim 5, the wearable article further including a first opening through which the first cable extends and a second opening through which the second cable extends.

7. The wearable electronic device of claim 6, wherein the first opening is a top and the second opening is a bottom opening.

8. The wearable electronic device of claim 5, wherein the electronic device is secured in the pocket by a flap.

9. The wearable electronic device of claim 5, wherein the pocket and the retractable cable assembly are each separately positioned on the wearable article.

10. The wearable electronic device of claim 5, wherein the pocket is positioned on a side of the wearable article.

11. The wearable electronic device of claim 5, wherein the pocket is secured to the wearable article by hook and loop fasteners.

12. The wearable electronic device of claim 5, wherein the pocket is built into the wearable article.

13. The system of claim 1, wherein the first wire has a first length of equal to or less than 45 cm, and the second wire has a second length of 15 cm to 30 cm greater than the first length.

14. The wearable electronic device of claim 5, wherein the second cable includes two wires, the two wires include a first wire having a length equal to or less than 45 cm, and a second wire having a length of 15 cm to 30 cm greater than the first wire.

* * * * *